United States Patent
Flowers et al.

(10) Patent No.: US 6,246,873 B1
(45) Date of Patent: Jun. 12, 2001

(54) SATELLITE COMMUNICATION CONFERENCE SYSTEM FOR USE IN A SATELLITE COMMUNICATION SYSTEM

(75) Inventors: Brian George Flowers, Geneva (CH); Johannes Egbertus Van Osch, Amsterdam (NL); Hizuru Nawata, Yokohama (JP)

(73) Assignees: European Broadcasting Union, Geneva (CH); NEC Corporation, Tokyo (JP)

( * ) Notice: Subject to any disclaimer, the term of this patent is extended or adjusted under 35 U.S.C. 154(b) by 0 days.

(21) Appl. No.: 08/750,019

(22) PCT Filed: Mar. 22, 1996

(86) PCT No.: PCT/GB96/00689

§ 371 Date: Mar. 11, 1997

§ 102(e) Date: Mar. 11, 1997

(87) PCT Pub. No.: WO96/31055

PCT Pub. Date: Oct. 3, 1996

(30) Foreign Application Priority Data

Mar. 24, 1995 (EP) .................................................. 95301987

(51) Int. Cl.⁷ ............................... H04M 3/42; H04Q 7/20
(52) U.S. Cl. ...................... 455/416; 455/12.1; 455/427
(58) Field of Search ................................... 455/12.1, 416, 455/427, 430, 450, 451, 452, 453, 464, 509, 570

(56) References Cited

U.S. PATENT DOCUMENTS

| | | | | |
|---|---|---|---|---|
| 4,018,993 | * | 4/1977 | Edstrom | 455/12.1 |
| 4,360,827 | * | 11/1982 | Braun | 455/12.1 |
| 4,590,417 | | 5/1986 | Tanaami et al. | 323/229 |

(List continued on next page.)

FOREIGN PATENT DOCUMENTS

| | | | |
|---|---|---|---|
| 0563937 | 10/1993 | (EP) | H04N/7/14 |
| 720325A2 | 12/1995 | (EP) | H04L/5/06 |
| 1-30338 | 2/1989 | (JP) | H04J/4/00 |
| 1-290335 | 11/1989 | (JP) | H04J/13/00 |
| 1138957 | 2/1985 | (SU) | H04M/3/56 |

OTHER PUBLICATIONS

"Nextar–III Ku–Band Outdoor Unit Standard Technical Description", STD–VE.109, Edition 1, NEC Corporation, Tokyo, Japan, 1–8, (Nov. 1991).

"Review of Satellite Multiaccess Protocols for VSAT Networks", *VSATS, Very Small Aperture Terminals*, Section 7.2; Editor: J. Everett; IEE Telecommunications Series 28, Peter Peregrinus Ltd., London, 127–143, (1992).

(List continued on next page.)

*Primary Examiner*—Nay Maung
(74) *Attorney, Agent, or Firm*—Schwegman, Lundberg, Woessner & Kluth, P.A.

(57) ABSTRACT

A conference station for use in a satellite conferencing system is arranged to receive communications on at least one satellite communication channel having a given frequency and to transmit communications on at least one satellite communication channel having a given frequency. The conference station itself controls whether or not the conference station can transmit on a satellite communication transmission channel by enabling transmission on a communication channel only when the conference station itself determines that that satellite communication channel is free for use or unoccupied. The conference station is also responsive to data signals received from a conference control station to adjust the satellite communication channel frequency or frequencies on which the conference station is able to receive or transmit signal.

The conference station may form a part of a group of similar conference stations to which the same communication channels are allocated.

53 Claims, 15 Drawing Sheets

U.S. PATENT DOCUMENTS

| | | | |
|---|---|---|---|
| 4,606,027 | | 8/1986 | Otani .................................... 371/43 |
| 4,616,108 | * | 10/1986 | Yamaguchi et al. ................ 455/12.1 |
| 4,682,367 | * | 7/1987 | Childress et al. .................... 455/416 |
| 4,716,585 | | 12/1987 | Tompkins et al. .................... 379/202 |
| 4,736,371 | | 4/1988 | Tejima et al. ......................... 370/95 |
| 4,755,773 | | 7/1988 | Ohmagari ............................. 332/9 R |
| 4,800,560 | | 1/1989 | Aoki et al. ............................ 370/104 |
| 4,803,385 | | 2/1989 | Nawata ................................. 307/516 |
| 4,803,440 | | 2/1989 | Hotta et al. ........................... 330/145 |
| 4,809,268 | | 2/1989 | Tejima et al. ......................... 370/93 |
| 4,901,369 | | 2/1990 | Momose et al. ...................... 455/84 |
| 4,907,291 | | 3/1990 | Yamamoto ............................ 455/78 |
| 4,965,851 | | 10/1990 | Tejima .................................. 455/52 |
| 4,967,413 | | 10/1990 | Otani .................................... 371/37.4 |
| 5,446,756 | * | 8/1995 | Mallinckrodt ........................ 455/427 |
| 5,555,443 | * | 9/1996 | Ikehama ............................... 455/12.1 |
| 5,815,817 | * | 9/1998 | Suzuki .................................. 455/416 |

OTHER PUBLICATIONS

Barbieri, A., et al., "Lan Interconnection and Videoconferencing Applications via Italsat Satellite", European Conference on Satellite Communications, pp. 173–186, (Nov. 2–4, 1993).

Namiki, J., et al., "0db E/b/No Burst Mode SCPC Modem with High Coding Gain FEC", IEEE International Conference on Communications, pp. 1792–1796, (Jun. 22–25, 1986).

John D. Spragins, "Telecommunications Protocols and Design", pp. 225–229, Jun., 1992.*

"VSATS (Very Small Aperture Terminals)", *IEE Telecommunications Series 28*, John Everett, ed., Peter Peregrinus Ltd., publ., (1992).

* cited by examiner

SATELLITE COMMUNICATION CONFERENCE SYSTEM FOR USE IN A SATELLITE COMMUNICATION SYSTEM

BACKGROUND OF THE INVENTION

This invention relates to a system for enabling a conference by satellite or other wireless communication and to a conference station and a conference control station for use in such a system.

In order to enable the exchange of news and other information, the members of the European Broadcasting Union (EBU) participate in a conference system which allows for the exchange of news and other, for example technical, information between conference stations of the broadcasters in the different member countries within the European broadcasting area. As illustrated very diagrammatically in FIG. 1, the conferences are controlled or coordinated from a control station or centre ('hub')1 at EBU headquarters in Geneva. Some broadcasters have terminals 2 with a direct communication link to the control centre 1 while other broadcasters have terminals 21 with a communication link via one of the terminals 2. Communication between the participants to a conference is achieved via a so-called "N−1" conference system in which a number N of 4-wire communication circuits are interconnected at the control centre 1 in such a way that each terminal 2 receives a mix of the voice signals from all of the other terminals 2 and 21 participating in the conference but does not receive its own voice signal. In addition, the use of a single divisible conference matrix developed by Bill Potter of the EBU in 1978 enables the participants to be divided into any number of conference groups.

The current conference system allows instantaneous access for all participants, availability of conference groups and flexibility but is costly because the connections between the participants are generally via telephone quality terrestrial analogue 4-wire circuits leased from the telecommunication authorities (PTT) or telecommunication companies of the member states.

It has therefore been proposed to replace the existing terrestrial conferencing system with a satellite conferencing system in which communication between the participants is primarily via satellite links or channels. This should be considerably cheaper especially if satellite communication channels are available on satellite capacity already leased for other purposes.

In one existing satellite conferencing system based on the known DAMA (demand assignment multiple access) satellite communication system, a conference control station or hub controls access by remote conference stations in the form of very small aperture terminals (VSATs) to satellite communication channels. In this system, a first satellite communication channel is used by the hub and a second satellite communication channel is allocated by the hub to a VSAT to establish a duplex connection between the hub and that VSAT, so enabling direct communication between the hub and that one VSAT. A mix of the communication on the duplex connection is fed to the other VSATs participating in the conference by the hub via a third satellite communication channel. When a participant at one of the other VSATs wishes to speak, that participant must contact the hub, for example via a telephone line or a separate satellite data channel, to request access to the satellite communication channel. It is then necessary for the hub to change the duplex connection from the one VSAT to the VSAT of the participant wishing to speak, an operation which can take about two seconds. Accordingly, access to the conference with this system is very slow and it is difficult to intervene in an on-going conversation.

Another approach which has been adopted by the Arab States Broadcasting Union (ASBU) effectively simply replaces the terrestrial 4-wire circuit connections with satellite duplex connections. This satellite conferencing system is best illustrated by the representational diagram shown in FIG. 2 where the satellite is shown as an annulus 30. Each of the conference stations 2 (eight are shown in FIG. 2) is pre-allocated its own satellite communication channel and communicates directly with the hub or control station 1 via the satellite 30 on this channel. The hub 1 is provided with an "N−1" conference system similar to that used in the existing EBU system and supplies a respective N−1 signal to each of the conference stations so that each conference station can hear what the other participants to the conference are saying without receiving back its own signal. Thus, each conference station has to be allocated two satellite communication channels, one for transmitting communication to the control station and the other for receiving its own unique N−1 mix of signals from the control station. This system enables participants at each conference station 2 to have unimpeded immediate access to the conference, but requires a minimum number of satellite communication channels equal to two times the number of conference stations participating in the conference. Although such a system may be suitable where the potential total number of conference stations participating in the conference is relatively small as in the case of the ASBU, it would be extremely costly in terms of satellite communication channel use for communication between a large number of conference stations. In addition, such a system requires signals from one conference station to be transmitted to another conference station via the hub or control station which means that the signal has to be transmitted twice by the satellite to reach the other conference station. This inevitably introduces communication delays. Moreover, because signals have to be received by the hub or control station and then retransmitted, there can be a loss of signal quality, especially if digital compression is used.

SUMMARY OF THE INVENTION

According to one aspect of the present invention, there is provided a voice channel card for a conference station or a conference station, comprising means for controlling access by that conference station to at least one communication channel.

In another aspect, the present invention provides a voice channel card for a conference station or a conference station, comprising means for enabling transmission of a communication to a communication channel only when the conference station determines that the communication channel is unoccupied.

A voice channel card or conference station embodying the invention enables the number of voice communication channels to be reduced and also reduces delays experienced by a participant in accessing a communication channel and transmitting a communication to participants at other conference stations.

In another aspect, the present invention provides a conference station comprising enabling means adapted to select for a transmission an unoccupied one of the at least two communication channels available to the conference station.

In another aspect, the present invention provides a conference station comprising means for disabling reception of a communication from a communication channel only when the conference station determines that it itself is occupying the channel.

According to another aspect of the invention, there is provided a voice channel card for a conference station, comprising means for enabling transmission of a communication to a communication channel and means for enabling reception of another communication from the same communication channel, depending on at the status of modulating and demodulating means of at least the voice channel card itself.

The present invention also provides a system for enabling a conference comprising a plurality of conference stations in accordance with any one of the aspects mentioned above.

The present invention also provides a conference control station for use in such a system having means (possibly in addition to the features discussed in the above aspects) for transmitting on a communication channel not available to the conference stations, the conference stations being adapted to receive signals on such communication channel.

An aspect of the present invention provides a system, in which each conference station of at least one group may have access on demand to the conference on the or any of the given number of communication channels allocated to the group without having to request the hub to provide that access. This should reduce access times and increase the speed of communication, facilitating natural conversation. Also, it is not necessary to pre-assign a separate communication channel to each of the conference stations. This means that the number of communication channels required for a conference can be considerably reduced. The fact that the number of communication channels allocated to the at least one group is small compared to the number of conference stations of the system should be understood to mean that the number of channels allocated to a group is generally two or possibly three or could even be only one if a two-way real time conversation is not required. Although four or even five or more further communication channels could conceivably be allocated to a group, in practice, it is generally unlikely and, indeed, undesirable for more than two participants to be contributing at the same time to a conference.

In another aspect of the invention, a conference station comprises means for selecting a further communication channel for a transmission so allowing, for example, signals to be transmitted on the same communication channel as used for a previous transmission to avoid any undue delays in the transmission and to reduce the possibility of collisions between signals from different conference stations.

Another aspect of the present invention provides a conference station comprising means for disabling transmission of signals from the conference station on an allocated communication channel when signals from another conference station are present on that communication channel. This should inhibit the possibility of collisions between signals from conference stations trying to transmit on the same communication channel.

Another aspect of the present invention provides a conference station or a conference control station, comprising means for detecting whether a transmission from that station is successfully received to enable the undesirable situation of two or more stations trying to transmit on the same channel because they started to transmit simultaneously or nearly so to be avoided. This may be achieved by, for example, detecting the return of a station identification included in the transmitted signal or by simply detecting the return of the transmitted signal.

Another aspect of the present invention provides a conference station comprising means for terminating an unsuccessful transmission and advising the participant at the conference station, for example by generating a warning signal, so that he or she knows that their signal was not transmitted correctly.

In another aspect, the present invention provides a conference station comprising means for inhibiting reception by a participant at that conference station of a signal transmitted by the conference station so as to avoid that participant being confused by the return of his or her own signal and to avoid echoes occurring via loudspeaker-microphone acoustic coupling. This may be achieved by, for example, disconnecting the return of a signal transmitted by a conference station from a signal supplied to the participant or by using some form of echo cancellation to cancel out the return signal.

In another aspect, a conference station may have a respective modulating means for each of the communication channels on which it can transmit, enabling the conference station to switch quickly between these communication channels without having to retune from one communication channel to another.

In another aspect, the present invention provides a station comprising means for changing the allocated communication channel(s) enabling the particular channel(s) to be determined according to conference requirements and communication channel availability.

In another aspect, the present invention provides a system comprising the conference stations divided into a number of groups with each group being associated with a different group of further communication channels and the conference stations in different groups being arranged to transmit and receive signals on different communication channels. This allows a number of different conferences to be carried out simultaneously using the system.

In another aspect, the present invention provides a conference control station comprising means for moving conference stations from one group to another so allowing the conference groups to be changed to meet particular requirements, for example to enable some of the participants in a given conference group to exchange information or discuss issues in private.

In another aspect, a conference control station may comprise means for coupling two or more groups together to enable signals to be transmitted between groups of conference stations. This may be achieved by using, for example, a conventional N−1 matrix at the control station. The use of such coupling means has the advantage of allowing, for example, two or more groups to communicate with each other without having to change the group allocation of conference stations which may be of particular advantage where only a brief communication between two groups is required during ongoing separate conferences of the groups. This ability to couple two or more groups together also has advantages in allowing the participants in one group to intervene in the conference of another group and, for example, the chairman or editor of a conference may be placed in a separate group from the remaining participants in that conference to allow that chairman to have access to the conference at all times.

Generally, the communication channels will be satellite communication channels. However any of the above aspects may also be applied to terrestrial, at least partially wireless, for example RF or microwave, communication systems.

Embodiments of the present invention will now be described, by way of example, with reference to the accompanying drawings, in which:

DETAILED DESCRIPTION OF THE INVENTION

It should be understood that the drawings are schematic and not to scale.

Figure 3:
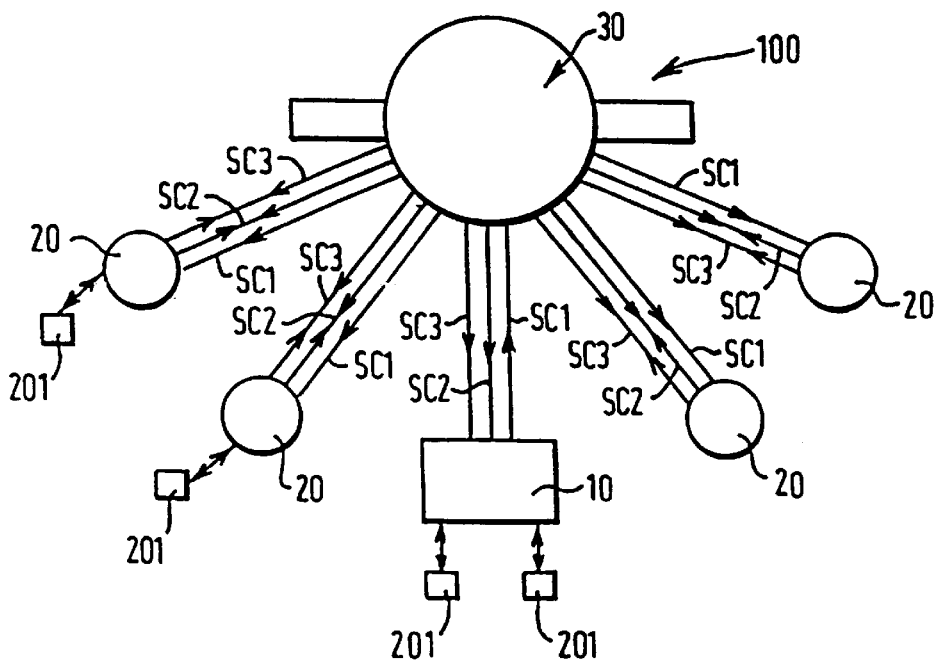
FIG. 3 shows a representational diagram of a satellite conferencing system in accordance with the present invention.

Referring now to the drawings, FIG. 3 shows a representational view of a satellite conferencing system 100 in accordance with the invention.

The satellite conferencing system 100 comprises a conference control station 10 located at a suitable control centre, for example the Eurovision control centre of the EBU in Geneva, and a number of conference stations 20 physically remote from the conference control station 10 but located within the footprint of a suitable satellite 30. Although only four conference stations 20 are shown in FIG. 3, the system will generally include many more conference stations 20. For example, as far as the EBU is concerned, the system 100 may include fifty or more conference stations 20 and the satellite transponder may be any one of Nos. 20, 21, 25 or 26 of Eutelsat II/F4 which are already leased by the EBU for other purposes. However any suitable satellite capacity may be used.

As indicated diagrammatically in FIG. 3, any conference station 20 may be coupled by appropriate terrestrial communication links to one or more subordinate conference stations 201 to enable those subordinate conference stations 201 to participate in a satellite conference. The conference control station 10 may also be connected via terrestrial links to one or more subordinate conference stations 201 or control stations of other conference systems outside the footprint of the satellite 30. For example, where the conference control station 10 is located in Geneva, then terrestrial links may be provided to a subordinate station in, for example, New York.

The conference control station 10 is arranged to transmit communication signals to the conference stations 20 via the satellite 30 on a first allocated satellite communication channel SC1 and to receive communication signals on second and third further allocated satellite communication channels SC2 and SC3. Each of the conference stations 20 is capable of transmitting communication signals via the satellite 30 to the control station 10 and to the other conference stations 20 on each of the second and third satellite communication channels SC2 and SC3. As will become clear from the following description, it is the conference station, not the hub, which control access to the second and third satellite communication channels.

The communication signals transmitted between the stations 10 and 20 are generally voice signals but could be any other suitable form of human communication signal, for example other audio or video signals, depending upon the available satellite capacity.

FIG. 3 shows the conference stations 20 connected in a single group with the control station 10 so as to form a single conference. However, where more satellite communication channels are available, the system 100 may allow for a number of simultaneous conferences consisting of different groups of conference stations 20. For each conference group, three allocated satellite communication channels will generally be required, a first satellite communication channel corresponding to the first satellite communication channel SC1 for enabling transmission by the conference control station 10 and second and third satellite communication channels corresponding to the satellite communication channels SC2 and SC3 shown in FIG. 3 for enabling communication by the conference stations 20 of a group with the conference control station 10 and the other conference stations 20 of that group.

As described above, the number of further satellite communication channels allocated to each conference station 20 in a particular group is limited to two. This limits the number of conference stations 20 from which participants can speak into the conference at a given time to two which is generally desirable so as to facilitate understanding of the discussions by all of the participants. However, it may be desirable in some circumstances to allocate, for example, three satellite communication channels to each conference station 20 in a particular group so as to allow simultaneous speaking by participants from three conference stations 20. Also, the system could be operated by making only one satellite communication channel available to the group, but this would not allow natural two-way conversation. The control station 10 should always be able to participate in a conference. The satellite communication channels will generally be allocated to a conference group by the control station 10 from the further satellite communication channels available to the system 100.

The number of conference groups into which the conference stations 20 within the system can be divided will, of course, depend upon the total number of satellite communication channels available to the system 100. For example, if it is desired to have the possibility of up to four separate conferences proceeding simultaneously, then, in the above example, twelve satellite communication channels will generally be required, three for each conference.

Of course, if unimpeded access by the control station to a conference is not necessary, then the control station need not have its own dedicated communication channel.

Figure 4:
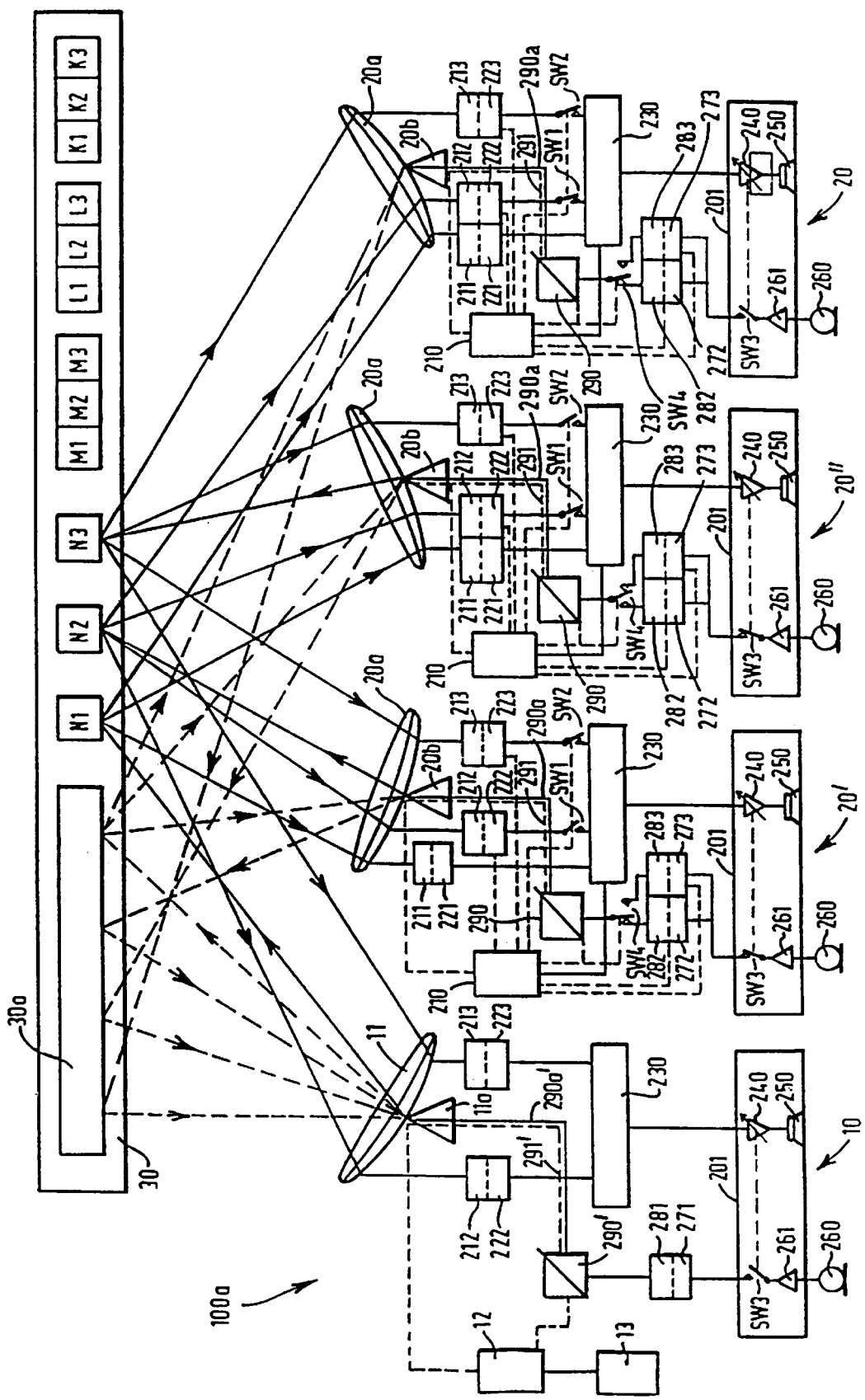
FIG. 4 shows in block diagrammatic form one example of a conference station for use in the system shown in FIG. 3.

FIG. 4 illustrates in block diagrammatic form one example of a satellite conferencing system 100a in accordance with the invention having the capability for enabling four independent simultaneous conferences K, L, and N.

The satellite 30 is illustrated very schematically as a block in FIG. 4 to show, as identified blocks, the satellite channels available for the system 100a.

As shown, there are four sets of three satellite communication channels K1 to K3, L1 to L3, M1 to M3 and N1 to N3 where the letter indicates the conference group to which the communication channel is allocated while the number indicates the allocation within the conference group of that channel. Thus, the satellite communication channels K1, L1, M1 and N1 are allocated to the control station 10 to allow it to communicate with the conference stations 20 while the satellite communication channels K2 and K3, L2 and L3, M2 and M3, and N2 and N3 are allocated to the conference stations participating in the particular conference group. A number of data channels 30a are provided to enable the exchange of control or housekeeping data between the conference control station 10 and the conference stations 20. Transmission on the satellite communication channels is illustrated by solid lines with the arrow indicating the direction of transmission while transmission on the data channels is indicated by the dashed lines, again with the arrows indicating the direction of transmission.

For simplicity, FIG. 4 shows only the transmission of signals between members of the conference group N, although all of the conference groups may be operational simultaneously. In addition, although FIG. 4 shows only three conference stations 20, generally there will be many more conference stations 20, for example fifty or more.

FIG. 4 shows signals being received on satellite communication channels N1, N2 and N3 by each of the three conference stations, with the left hand conference station 20' transmitting on the channel N2 and the centre conference station 20" transmitting on the channel N3.

Each of the conference stations 20 comprises a satellite dish 20a mounted on a support 20b. Generally, for the satellite transponders currently leased by the EBU which have a wider beam than most satellite transponders, the satellite dish 20a will be a 1.8 meter or 2.4 meter diameter dish, although 3.7 meter diameter satellite dishes may be used for conference stations at the periphery of the satellite footprint. The conference control station 10 will generally have a larger satellite dish 11, generally a 3.7 meter or 4.5 meter satellite dish mounted on a support 11a. It is preferred that the dish sizes and transmitter power rating should be sufficient to enable the addition of star configuration data-communication facilities without modification, if desired. If narrower beam satellite transponders are used then the satellite dishes may be, for example, a size smaller with 1.8, 2.4, 3.7 and 4.5 meter dishes being replaced by 1.2, 1.8, 2.4 and 3.7 meter dishes, respectively.

Figure 5:
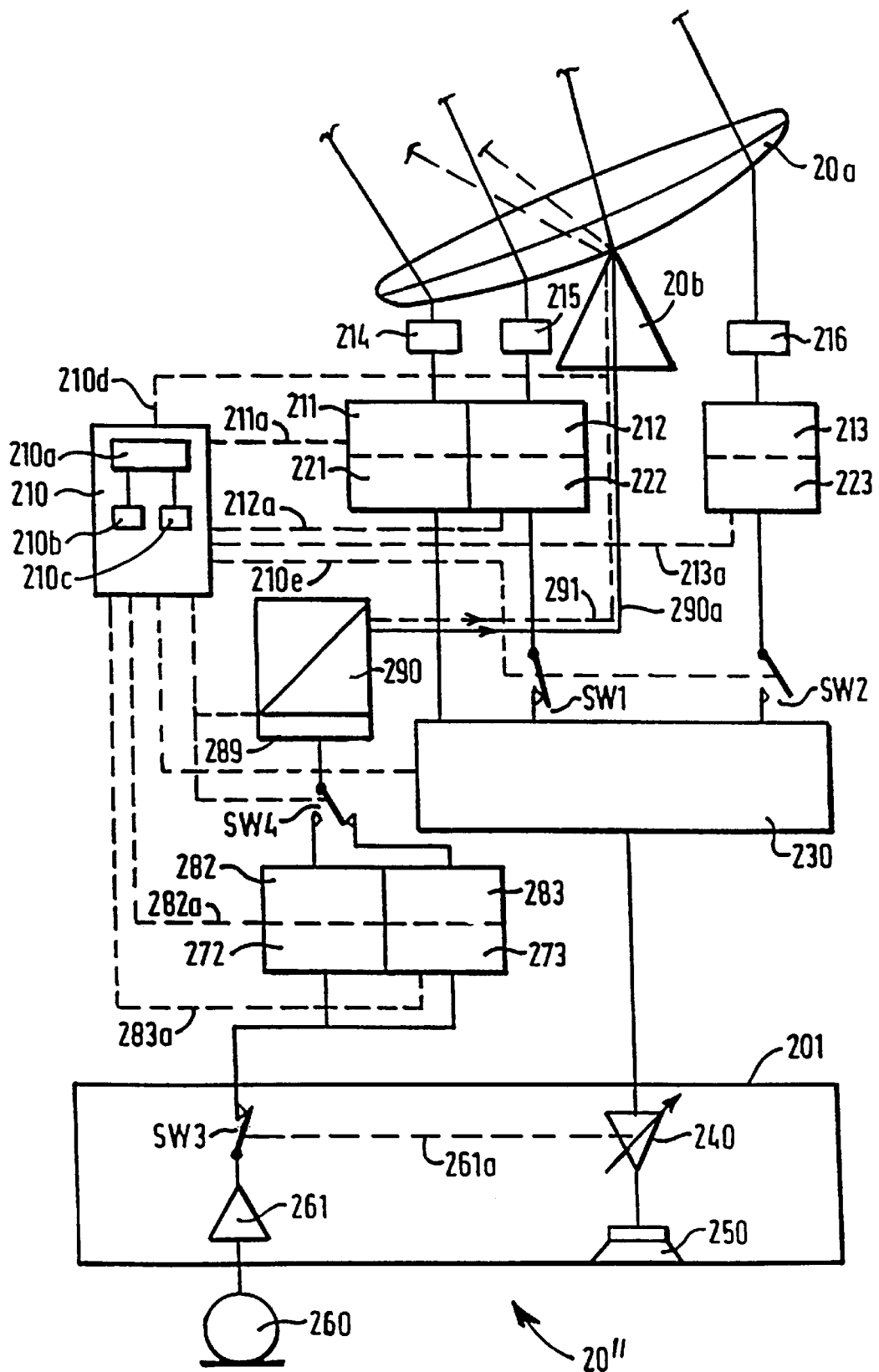
FIG. 5 shows in block diagrammatic form in slightly more detail a conference station of the system shown in FIG. 4.

A conference station 20", is shown enlarged and in slightly more detail in FIG. 5. Each conference station 20 comprises a respective demodulator 211, 212 and 213 for receiving and demodulating signals from the allocated satellite communication channels, in this case channels N1, N2 and N3 via a respective low noise amplifier (LNA) and associated down-converter (shown as blocks 214, 215 and 216 in FIG. 5), both of conventional form. The low noise amplifiers amplify the incoming satellite signals received by the satellite dish 20a while the down-converters change the frequency of the incoming signals from the satellite channel carrier frequency to the intermediate frequency of the demodulators. Each demodulator 211, 212 and 213 is associated with a respective digital-to-analogue converter 221, 222 and 223 for converting the demodulated digital signals into analogue signals. The analogue signals output from the digital-to-analogue converters 221, 222 and 223 are supplied to a conventional audio mixer 230 which provides an output via a variable power amplifier 240 to a loudspeaker 250 of a control panel 201.

The digital-to-analogue converters 222 and 223 are coupled to the mixer 230 via respective switches SW1 and SW2 which are controlled by a control unit 210 as will be described hereinafter.

The control panel 201 may be situated at any appropriate location. Thus, for example, in the case of the EBU, the control panel 201 may be situated in the newsroom of the broadcaster to whom the control station 20 is allocated.

The control panel 201 also carries a microphone 260 which is coupled to a conventional amplifying device 261 which operates when a 'push-to-talk' switch SW3 is operated by a participant at the conference station 20, as in the current EBU terrestrial system. As shown by the dashed line 261a in FIG. 5, the switch SW3 is coupled to the variable power amplifier 240 in a known manner so that when the 'push-to-talk' switch SW3 is activated, the loudspeaker output level is automatically reduced or dimmed to a level that does not cause noticeable acoustic coupling from the loudspeaker 250 to the microphone 260. Typically, the reduction represents a 15 dB attenuation with respect to the normal output level of the loudspeaker 250. Also, as again is known for such microphone/loudspeaker terminals or control panels, the microphone 260 will generally be a proximity microphone to reduce the acoustic feedback level.

The switch SW3 couples the signal from the amplifying device 261 to each of two analogue-to-digital converters 272 and 273. The analogue converters 272 and 273 are coupled via respective voice-activated modulators 282 and 283 and a two-way switch SW4 to a high power amplifier 290 which may be any suitable form of solid state power amplifier. As shown in FIG. 5, the switch SW4 is coupled to the high power amplifier 290 via an up-converter 289 of known type which comprises a stable local oscillator for converting the frequency of the output signal of a modulator 282 or 283 to the actual satellite channel carrier frequency. The high power amplifier 290 supplies an output signal to the satellite dish 20a.

The demodulators and digital to analogue converters 211 and 221, 212 and 222 and 213 and 223 are shown separated by only a dashed line because they may be provided as a single conventional off-the-shelf components such as MODEMS plus CODECS as may the analogue-to-digital converters and modulators 272 and 283 and 273 and 283. Any suitable form of MODEM, preferably one capable of adaptive differential pulse code modulation using standard quadrature phase shift key (QPSK) modulation with FEC (forward error correction) may be used. The arrangement should preferably be such that each satellite communication channel is capable of transmitting about 33 Kilobits per second (Kbits/s) with 32 Kbits/s being uncompressed ADPCM (adaptive digital pulse code modulation) voice data and the remainder overhead data identifying the transmission.

Operation of the MODEMS and switches SW1, SW2 and SW4 and the high power amplifier 290 is controlled by the control unit 210 which may, as illustrated schematically in FIG. 5, comprise a microprocessor 210a with associated read only memory 210b and random access memory 210c. The dashed lines in FIG. 5 again show data and control communications but this time between the control unit 210 and the various components of the conference station 20. The operation of the control unit 210 will be described in greater detail below.

The control station 10 also has signal transmitting and receiving apparatus which is similar to the signal transmitting and receiving apparatus of the conference stations 20. However, for each conference group, the control station 10 requires only two demodulators 212 and 213 and associated digital-to-analogue converters 222 and 223 and a single modulator 281 and associated analogue-to-digital converter 271. In addition, the switches SW1, SW2 and SW4 are not required. Normally the control station 10 will have a higher power amplifier than the conference stations 20 to ensure that its signal should normally always get through. Thus, typically the amplifiers 290 of the conference stations 20 may be 1 to 10 watt solid state power amplifiers while the amplifier 290' of the control station 10 may have a power of up to about 100 watts.

The control station 10 has a network control system 12 which, although not shown, may again comprise a microprocessor and associated read only memory and random access memory. The network control system 12 supplies control signals via the data channels 30a to control the groups to which conference stations 20 are allocated as will be described below. In addition, the network control system 12 controls operation of an N-1 matrix to enable, as will be described below, communication between, for example, different satellite conference groups. The network control system 12 is coupled to a conference selection panel 13 which enables an operator or coordinator at the control station 10 to control the allocation of conference stations to groups and to control communication between different conference groups.

Operation of the conference system 100a shown by FIGS. 4 and 5 will now be explained with the help of FIGS. 6 and 7 which show, respectively, a simplified flowchart for explaining the operation of the control unit 210 of a conference station and part of the conference selection panel 13 at the control centre 10.

Where the conference is a news conference allowing broadcasters to participate in an exchange of views about news items, then the conference system will generally be operating continuously and 24 hours a day, although there may be set times for formal discussions.

The conference selection panel 13 has at least six illuminatable control buttons for each conference station. In the arrangement shown in FIG. 7, the six control buttons associated with a particular conference station 20 are arranged in a vertical strip. For simplicity, in the examples shown, the strips of control buttons are arranged in blocks of four. The control panel 13 shown in FIG. 7 is thus intended for controlling a maximum of forty conference stations 20. Typically, two such control panels may be provided to enable up to a maximum of eighty conference stations 20 to be controlled from the conference selection panel. Although not shown in FIG. 7 the coordinator at the control station 10 may be provided with an array of two further control buttons for each conference station 20 for reasons which will be explained below.

Figure 7:
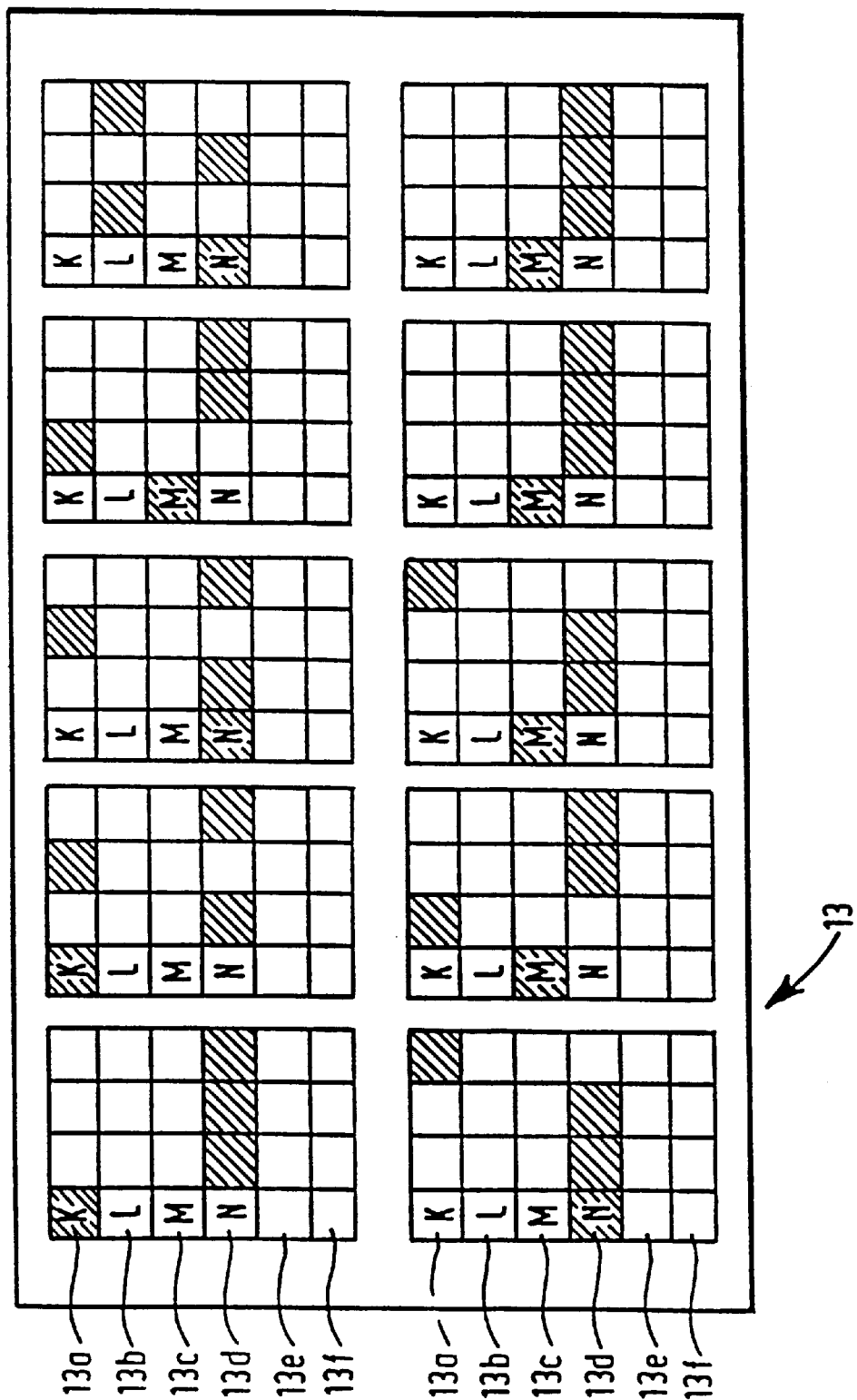
FIG. 7 shows a diagrammatic view of one example of a control panel for use at a conference control station of a system in accordance with the present invention.

As shown in FIG. 7, the top four control buttons 13a to 13d of each control strip are labelled, in sequence, K, L,M,N and are used to enable the conference stations to be allocated to a particular conference group. The fifth control button 13e is provided for enabling the control station 10 to disable or enable transmission by that particular conference station 20. The final control button 13f of a strip is a carrier presence indicator button which lights up to indicate to the coordinator that that particular conference station 20 is transmitting on one of its two allocated satellite communication channels. The conference station control buttons 13a to 13d and the transmission enable/disable control button 13e comprise appropriate, for example push button, switches which when activated by a coordinator cause the appropriate conference station to be allocated to one of the groups K, L, M or N or for transmission from that conference station to be enabled or disabled. The control buttons 13a to 13d include lights such as LEDs or tungsten filament lamps which light up in a first colour, for example yellow, when activated while the enable/disable control button 13e is arranged to light up in a second colour, for example green, when transmission by that particular conference station is enabled and to flash when transmission is disabled. If the conference station 20 does not respond to the control station, the button 13e either does not light up or shines red if a bicolour LED is used. The carrier presence control button 13f lights up in a third, for example red, colour when the presence of a voice carrier from that conference station is detected.

In order to allocate conference stations 20 to the conference group N, a coordinator at the control station 10 will activate the appropriate buttons 13d associated with the conference stations 20 desired to be in the group. Activated control buttons 13d are shown shaded in FIG. 7. Thus, in the particular configurations shown by way of example in FIG. 7, twenty five conference stations 20 are allocated to the conference group N, eight to conference group K, two to conference group L and five to conference group M. Only one of the control buttons 13a to 13d can be activated for a particular conference station at a time. Activating a different control button 13a to 13d for that conference station 20 will transfer the conference station to the conference group associated with the activated control button. Accordingly, a conference station 20 is always selected to a conference group and cannot be allocated to more than one conference group at the same time.

Once the coordinator has allocated conference stations 20 to a particular group, the network control system 12 causes the high power amplifier 290' of the control station 10 to send, as indicated by the dashed line 291', control data signals via appropriate satellite data channels 30a and the satellite 30 to the selected conference stations. The control data on the satellite data channels is received via the appropriate satellite dishes 20a and supplied to the respective control units 210 of the chosen conference stations 20.

Figure 6:
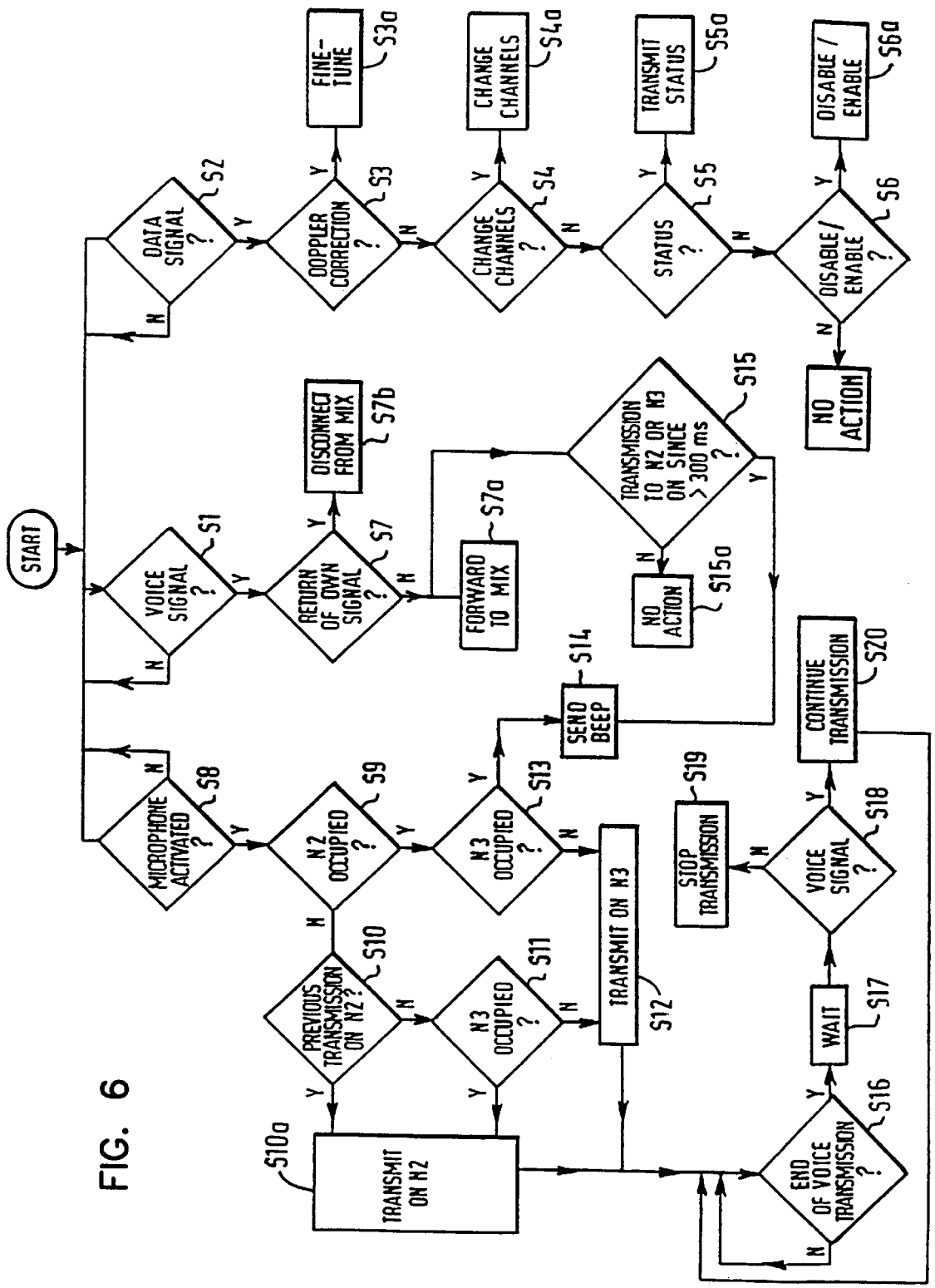
FIG. 6 shows a schematic flow chart illustrating the operation of a control unit of the conference station shown diagrammatically in FIG. 5.

As indicated by the flowchart in FIG. 6, assuming that the conference station 20 is active, then the control unit is placed in a ready mode awaiting an incoming data signal on a data channel 30a (step S2), an incoming voice signal on a satellite communication channel (step S1) or activation of voice activated device within a modulator 282 or 283 of that conference station (step S8). When the control unit detects at step S2 that the incoming satellite signal is a control data signal on a satellite data channel, the control unit 210 next determines what sort of data signal is being received from the control station 10. In this example, the control unit 210 checks to see whether a "Doppler correction" signal is being received from the control station 10, that is a signal to fine tune the demodulators 211, 212 and 213 to account for Doppler shift of signals transmitted from the satellite 30 (down leg signals) due to movement of the satellite in its geosynchronous orbit. The control unit 210 checks at step S4 to see whether the control station 10 is instructing it to re-tune the demodulators 212 and 213 to different frequency satellite communication channels, for example to change the conference group to which the conference station 20 is allocated. At step S5, the control unit 210 checks to see whether the data signal is a routine request for information on the operational status of the control station and at step S6 checks to see whether a disable signal (or an enable signal if the conference station 20 was previously disabled) has been received from the control station 10 to disable (or enable) voice communication from that station.

Where a "Doppler correction" signal is received, then, as indicated by box S3a in FIG. 6, the control unit sends control signals via the control lines 211a, 212a and 213a, as appropriate, to fine-tune the demodulators 211, 212 and 213 to enable the conference station 20 to lock on quickly to signals transmitted to it via the satellite 30 on the three satellite communication channels N1, N2 and N3 allocated to that control station 20.

Where the data signal is a request for status information, then, as indicated by box S5a in FIG. 6, the control unit 210 transmits the appropriate data via the high power amplifier 290 to the transmitter 21b for transmission via the data channels 30a to the control station 10. Generally, data signals for transmission on the data channels 30a will be combined with any voice and housekeeping data signals for transmission on the satellite communication channels and any data communication signals at the input to the up-converter 289, with the voice, data and data communication signals each having their own respective carrier frequencies. The supply of voice signals from the amplifier 290 or 290a' to the satellite dish 20a or 11 is indicated by a solid line 290 or 290a' while the supply of data signals is indicated by a dashed line 291 or 291'.

In response to a disable/enable instruction from the control station 10, then transmission by the conference station 20 is disabled (or enabled if it was previously disabled) at step S6a. This may be achieved by the control station 210 disabling (or enabling) the modulators 282 and 283 to prevent transmission of voice communication by the conference station 20. For example, the switch SW4 may be a three, rather than a two, position switch having a central position in which neither of the modulators 282 and 283 is coupled to the amplifier 290. As another alternative, the control unit 210 may over-ride the operation of the voice-activation within the modulators. When a conference station 20 is disabled, the amplifier 290 remains operative to enable transmission of data signals to allow data communication with the control station.

When the control unit 210 receives a disable instruction from the control station 10, the control unit 210 may also send a signal to the control panel 210 to, for example, cause a light to flash on the control panel 210 to indicate to the local participants that their transmission has been disabled. Transmission may be disabled if, for example, the local participants have inadvertently left the microphone 260 switched on when they are not intending to speak into in a conference.

Where a signal instructing the control unit 210 to change the satellite communication channels is received from the control station 10 at step S4, then, as indicated by step S4a, the control unit 210 supplies control signals on the control lines 211a, 212a, 213a, 282a and 283a to the demodulators 211, 212 and 213 and modulators 282 and 283 to re-tune them in accordance with the instructions received from the control station to the newly allocated satellite communication channels. In the present case the activating of the control light N for a particular conference station 20, causes the control station 10 to transmit instructions on the data channels to that conference station 20 to re-tune the demodulators and modulators to the appropriate ones of the satellite communication channels N1 to N3 allocated to the group N, if the conference station 20 is not already tuned to those channels. Thus, the modulators 282 and 283 are tuned to the satellite communication channels N2 and N3 as are the demodulators 212 and 213 while the demodulator 211 is tuned to the satellite communication channel N1.

When, as shown in FIG. 6, the control unit 210 detects at step S1 an incoming voice signal on one of the allocated satellite communication channels (N1, N2 or N3 in this example), then the control unit 210 checks at step S7 whether the signal being received by the satellite dish 20a is the return or down leg of a communication signal which has just been transmitted by that conference station 20. If the answer is no, then, as indicated by step S7a, the incoming voice signal is supplied via the mixer 230 to the loudspeaker 250. If the answer is yes, then, as indicated by step S7b, the control unit 210 sends a signal via control line 210e to open the appropriate one of switches SW1 and SW2 to disconnect the return of the conference station's own signal from the voice signal mix supplied to the loudspeaker 250 so that the participants at the control station 20 are not confused by hearing the delayed return of their own transmission.

The detection of the return of the conference station's own transmission may be achieved by using the overhead data in the transmitted signal to identify the source of the signal to enable its disconnection from the mix. As another possibility, the conference stations 20 may use the data channels to indicate that a conference station is transmitting on a particular satellite communication channel and this "house-keeping" data may be used to cause the control unit 210 to disconnect the return signal. However, where there are a large number of conference stations 20, then they may not all be able to have instantaneous access to the data channels and accordingly there may be some delay before an indication of a voice transmission can be provided on the data channels.

It may also be possible to use an echo canceller to detect the return of a conference station's own signal and then to use that echo canceller to cancel out the return signal from the mix. However, the effectiveness of the echo cancellation would be determined by any signal distortion due to, for example, rain-fade.

As yet another possibility, because the control unit 210 will know when the conference station 20 is transmitting on one of the satellite communication channels N2 and N3, then the control unit 210 may simply disconnect the appropriate satellite communication channel from the signal supplied to the mixer 230 by opening the appropriate one of the switches SW1 and SW2 after a small delay, for example 250 milliseconds from the start of the transmission, and then re-connecting that signal to the mixer after a given delay, for example 270 milliseconds, after the end of the transmission by the conference station 20. This simple approach does not, however, take account of the possibility of collisions which may occur if two conference stations 20 try to transmit on the same satellite communication channel within a short time, for example 260 milliseconds of each other. If this happens, either the stronger of the two voice signals will get through or neither of the voice signals will be received by the satellite.

It is important for the conference station to be able to determine whether its own transmission has been received by the satellite and to warn the participants at the conference station if its transmission has not been received. Thus, as indicated in FIG. 6, if the control unit 210 determines at step S7 that the return of that conference station's own signal has not been detected, then the control unit checks at step S15 whether or not the conference station had been transmitting on satellite communication channel N2 or N3 about just over 300 milliseconds ago. If the answer is yes, then the control unit causes, at step S14, the mixer 230 to send an audible warning via the loudspeaker 250 to the local participants to warn them that their transmission was not well received and also disables the transmission. If the answer is no at step S15 then, as indicated at step S15a in FIG. 6, no action is taken.

The control unit 210 also checks, as indicated by step S8 in FIG. 6, if the voice-activated device within one of the modulators 282 and 283 has been activated. If the answer is no, then the control unit 210 returns to its waiting state waiting for either an incoming satellite signal or an input from the microphone 260. When the voice-activated device of a modulator is activated, the control unit 210 checks at step S9 to see whether the satellite communication channel N2 is occupied. If the answer is no, then the control unit 210 preferably checks at step S10 to see whether the previous transmission by this conference station was on the satellite communication channel N2. If the answer is yes, then the control unit 210 causes the signal to be transmitted on channel N2 as indicated at step S10a by sending a control signal to the switch SW4 to couple the modulator 282 to the high power amplifier 290 so that the voice communication from the microphone 260 can be transmitted on the satellite communication channel N2. If the previous communication from this conference station was not transmitted on the satellite communication channel N2, then the control unit 210 checks at step S11 to see whether the other satellite communication channel N3 is occupied. If the answer is no, then the control unit 210 causes, as indicated by step S12, the switch SW4 to couple the modulator 283 to the high power amplifier 290 so that the voice communication can be transmitted on the satellite communication channel N3. If the answer at step S11 is yes, then the control unit 210 controls the switch SW4 to cause transmission of the voice signal on the satellite communication channel N2 as indicated by step S10a.

Where the answer at step S9 is that the satellite communication channel N2 is occupied, then the control unit 210 checks at step S13 whether the satellite channel N3 is occupied. If the answer is no, then the control unit 210 causes the switch SW4 to be moved to the position enabling transmission on the satellite communication channel N3 as indicated by step S12. Where the answer at step S13 is yes so that both satellite communication channels are occupied, then the control unit 210 sends at step S14 an audible signal or beep to the participants at the conference station 20 via the loudspeaker 250 to indicate that participation is not possible at this time. In addition, the control unit 210 supplies control signals via the control lines 282a and 283a to deactivate transmission of signals from the conference station 20 on either satellite communication channel N2 or N3.

The method described above with reference to steps S9 to S14 enables voice communication from a conference station 20 to be continued on the same satellite communication channel so that, for example, a pause in mid-sentence of about a second does not cause a change in the satellite communication channel.

The control unit 210 may be arranged to cause a delay in the transmission of the voice signals so that transmission of the carrier on the selected satellite communication channel occurs slightly before transmission of the voice signal, for example the control unit 210 may cause the transmitter to send the carrier a few milliseconds in advance of the first syllable of the voice transmission by delaying the speech signal before it arrives at the high power amplifier 290. This delay could occur in, for example, the analogue-to-digital converter 272 or 273. However, to avoid unacceptable delays in communication, any such delay of the voice signal should not exceed about 30 milliseconds. The advantage of delaying the voice signal a few milliseconds after transmission of the carrier signal is activated is that it provides the receiving conference stations 20 and control station 10 with more time to lock onto an incoming transmission before the voice signal is received. In addition, it gives the transmitting conference station 20 more time to detect the return of its own transmission and to disconnect that transmission from the signals supplied to the mixer.

As indicated in FIG. 6, when the control unit 210 detects at step S16 the end of the voice signal, then the control unit 210 waits for a predetermined period, as indicated by step S17, for example about 500 milliseconds, and then checks at step S18 whether there is a resumption of the voice signal. If the voice signal has not resumed, then the control unit 210 stops the transmission at step S19. Otherwise transmission continues as indicated by step S20. This allows for small pauses in the voice signal input from a participant without loss of the satellite communication channel.

As shown in FIG. 4, the right hand conference station 20 is not transmitting and so both switches SW1 and SW2 are closed to enable supply to the mixer 230 of voice signals on all three allocated communication channels N1, N2 and N3. However, conference station 20' is transmitting on channel N2 and conference station 20" is transmitting on channel N3 so their respective switches SW1 and SW2 are open to prevent their own voice signals being supplied to the mixer 230

As will be appreciated from FIG. 5 in particular, voice signals transmitted by the control station 10 on the first satellite communication channel N1 are always received by the conference stations 20 so that a coordinator at the control station 10 can always intervene in a particular conference.

The fact that the coordinator can intervene enables control of the conference, for example allowing the coordinator to advise a conference station 20 that they have inadvertently left their microphone switched on (as indicated by the control button 13f). In addition, if the coordinator feels that two participants are monopolising the conference with a two-way discussion, then the coordinator may advise those two parties that he is transferring them to another group so that they can continue their two-way conversation without hindering communication between the other participants to the main conference. It is, of course, also possible that participants to the conference may request transfer to another conference group so that they can conduct a private conference.

As indicated above, transfer of conference stations between groups is easily achieved by use of the control panel 13 which enables the coordinator simply to transfer a conference station 20 from one conference group to another conference group by activating the appropriate one of the control buttons 13b to 13d to send the data signals to the conference station to change its allocated satellite communication channels.

A conferencing system in accordance with the present invention may be provided with even greater flexibility by allowing the satellite conference groups to be coupled together via a conventional N−1 matrix at the control station 10.

FIG. 4 shows the control station 10 as automatically supplying the satellite communication channels for a particular group, for example channels N2 and N3, via the associated mixer 230 to the loudspeaker 250 at the control station 10. Generally, the control station 10 will have sufficient MODEMS to enable it to receive signals on all the satellite communication channels allocated to the system enabling the control station 10 to listen to and participate in each of the conference groups.

The incoming signals from the respective groups K to N may be supplied by respective MODEMS to different mixers and one of the additional row of control switches mentioned above may be used to enable the coordinator at the control station 10 to couple the outputs of selected mixers to the loudspeaker 250 to select the groups he or she wishes to listen to. Preferably, however, the outputs of the mixers 230 of the groups are coupled to a conventional N−1 network which enables the control station 10 to listen in to any or all of the conference groups and, in addition, allows the control station 10 to enable communication between different conference groups. The conference selection panel 13 may also be provided with control buttons to enable the coordinator to listen to selected individual conference stations in different groups either via the loudspeaker 250 or a separate audio output.

Figure 8:
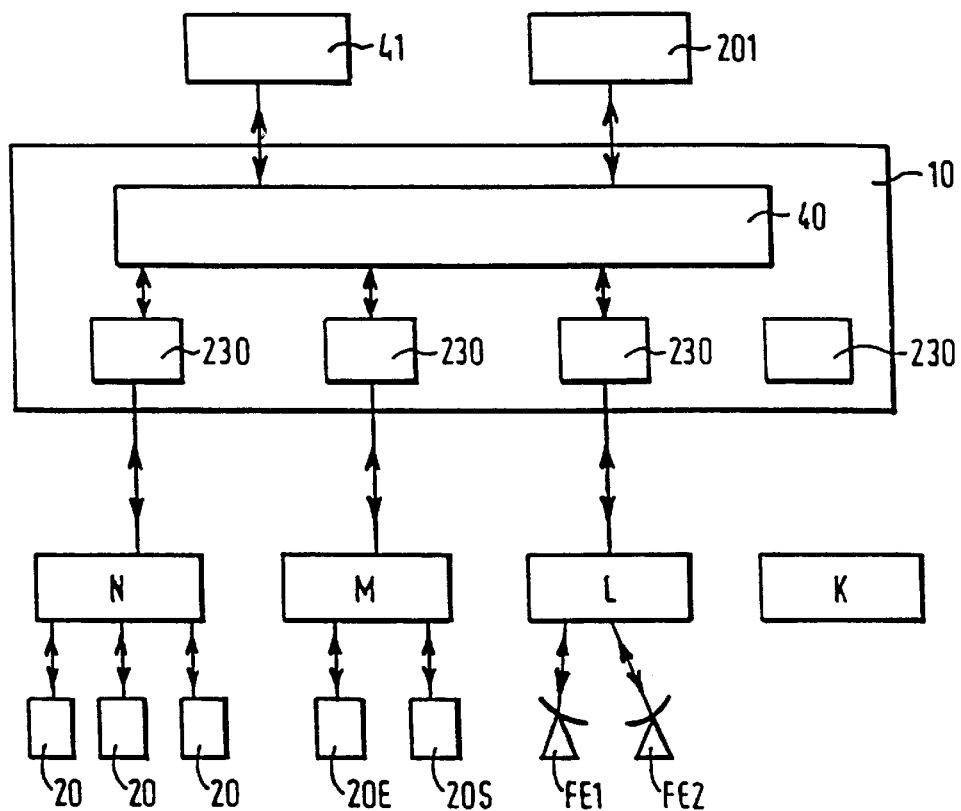
FIG. 8 is a simplified diagrammatic representation of one possible configuration for a system in accordance with the present invention.
Figure 9:
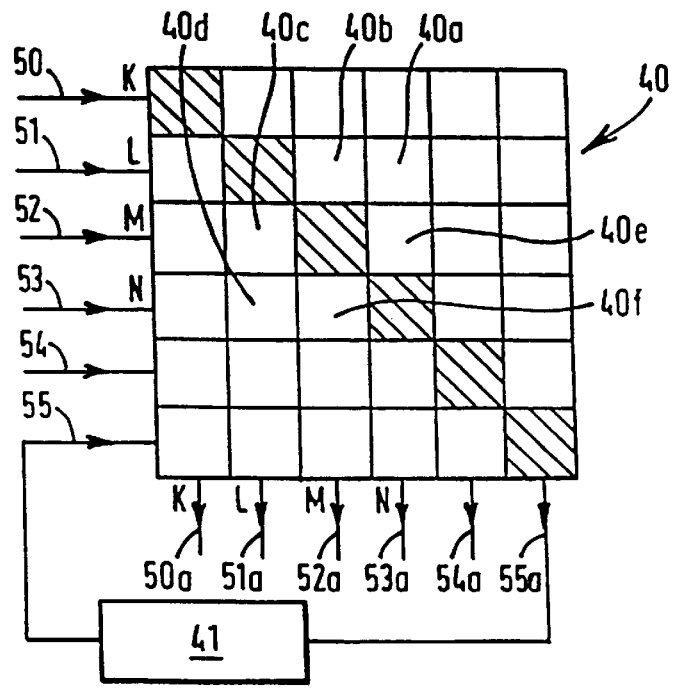
FIG. 9 shows diagrammatically an N-1 conferencing network.

FIG. 8 illustrates schematically one situation where communication between groups may be of advantage while FIG. 9 shows diagrammatically an N−1 matrix network. The blocks labelled K, L, M and N in FIG. 8 represent the four conference groups mentioned above. The block N is shown coupled to a number of conference stations 20, only three being shown. The block M is shown as being coupled to two conference stations labelled 20E and 20S. The conference group L is in this example allocated to two fly-away earth stations (FESs) which will generally constitute 90 cm satellite dishes transportable to remote or difficult locations to enable information, for example news, input to the control station 10. Each of the FESs FE1 and FE2 in FIG. 8 is allocated a dedicated one of the two satellite communication channels L2 and L3 available in the conference group L so that they have unimpeded access to the control station 10. In the example shown in FIG. 8, the conference group K is unused.

In the interests of simplicity, FIG. 8 omits most of the component parts of the control station 10 and simply shows the mixer 230 at the control station 10 associated with each of the conference groups. The output of each mixer is supplied to a respective input of an N−1 matrix 40 of the type shown in FIG. 9 similar to the one already in existence at EBU headquarters. Thus, conference groups K to N supply inputs to the N−1 matrix 40 on matrix inputs 50 to 53. There is also an input 54 to enable the voice input from the hub or control station microphone to be supplied to the N−1 matrix and a further input 55 to supply an input signal from any N−1 local network 41 communicating with the control station, for example EBU's existing N−1 conference system.

The N−1 matrix 40 has outputs 50a to 53a for supplying signals to the conference groups K to N via the appropriate first satellite communication channel K1, M1, L1, N1 from the conference station 10, an output 54a to the loudspeaker 250 at the control panel 201 of the control station 10 and an output 55a to the local N−1 network. As with the existing N−1 network at EBU headquarters, under software control, signals from any one of the inputs 50 to 55 to the N−1 matrix may be supplied to any one of the outputs 50a to 55a except the output corresponding to the input. The inadmissible connections are shown shaded in FIG. 9. The coordinator or operator at the control station 10 may be provided with an N−1 array of control buttons representing the N−1 matrix or a selection panel similar to that shown in FIG. 7.

By activating appropriate ones of the matrix control buttons, input signals 50 to 55 may be supplied to selected ones of the outputs 50a to 55a. Thus, for example, by activating the switches corresponding to the matrix crosspoints identified as 40a to 40f in FIG. 9, the conference groups L and M can communicate with the conference group N and each other via the control station 10. Although this is a double-hop arrangement because the signals from each conference group have to be transmitted twice by the satellite to reach the other conference groups, it does allow the participants in the conference groups L and M to have unimpeded access to the conference group N because each of the two participants to the conference groups L and M can be allocated one of the two satellite communication channels of that group. This has the advantage of enabling the fly-away earth stations FE1 and FE2 which may be located in remote areas to have easy access to the main conference N. Also, as shown, two participants 20E and 20S in the conference group N can be placed in the conference group M to enable them to act as chairmen or editors because they have unimpeded access to the conference group N. For example, in the case of a news conference, an editor 20E for news items and an editor 20S for sports items may be allocated to the conference group M. Because the allocation of conference stations 20 to the different groups can be changed by the control station 10, the participants acting as editors or chairmen may be rotated on an appropriate basis.

Figure 1:
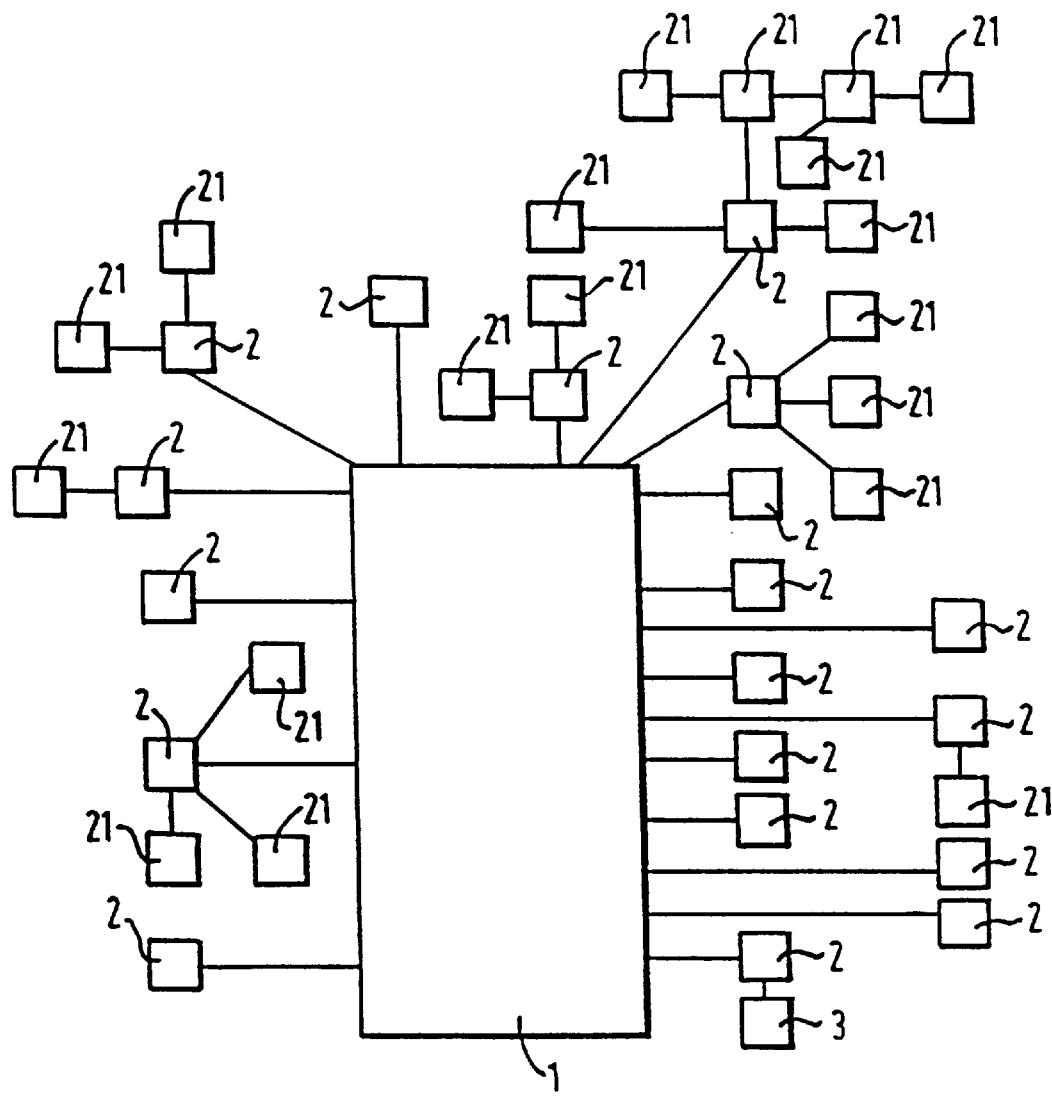
FIG. 1 shows a diagrammatic representation of the coupling of a conference control station to conference stations.
Figure 2:
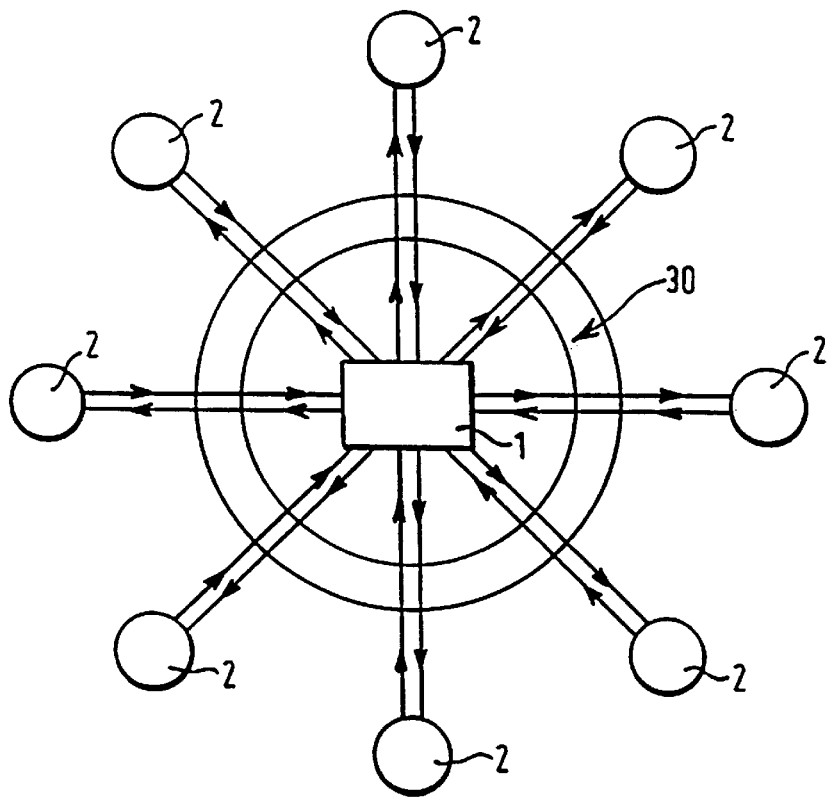
FIG. 2 shows a representational diagram of a previously proposed satellite conferencing system.

Of course, N−1 matrix networks may be used to enable the subordinate stations 21 shown in FIG. 1 to participate in a conference via their associated conference stations 20.

Where a satellite conference system in accordance with the invention has the potential for four conference groups each using three satellite communication channels then only 0.5 MHz of total satellite channel bandwidth will be required regardless of the total number of conference stations compared to the 3.6 MHz bandwidth required for the system shown in FIG. 2 having forty-eight conference stations.

In addition, the delay between transmission and reception of a communication signal should be half that of the system shown in FIG. 2, that is typically about 260 milliseconds, because each communication signal is only transmitted once by the satellite.

Figure 10:
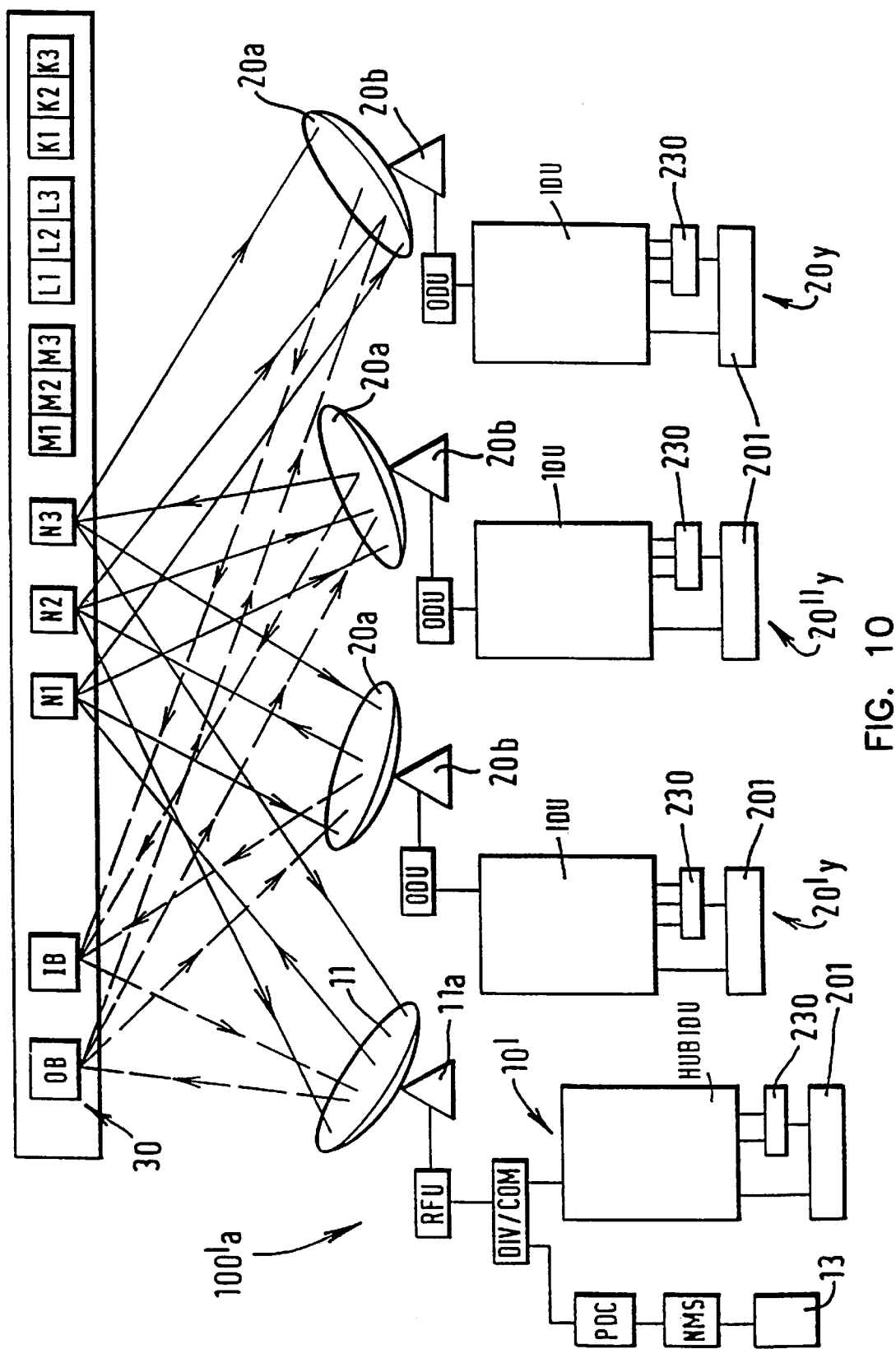
FIG. 10 shows a representational diagram of another embodiment of a satellite conference system in accordance with the present invention.

FIG. 10 shows in block diagrammatic form similar to FIG. 4 another example of a satellite conferencing system in accordance with the present invention.

FIG. 10 differs from FIG. 4 primarily in the detailed construction of the conference control station 10' and the conference stations 20y. In addition, FIG. 10 shows two separate data channels IB and DB for monitor and control communication between the conference control station 10' and the conference stations 20y, 20'y and 20"y as is well known in practice in the art. The conference system may comprise more or fewer conference stations than actually shown in FIG. 10.

Each of the conference stations 20y, 20'y and 20"y comprises a satellite dish 20a mounted on a support 20b plus an outdoor unit ODU, an indoor unit IDU, a conventional audio mixer 230 (similar to that shown in FIG. 4) and a control panel 201, again similar to that shown in FIG. 4.

The conference control station or hub 10' comprises a satellite dish 10a and outdoor RF equipment RFU similar but typically, although not necessarily, larger in size and rated power than the conference stations.

The outdoor RF equipment RFU is connected through a divider/combiner unit DIV/COM to the hub indoor equipment HUB IDU, which comprises similar components to the indoor units IDU of the conference stations, and to a Primary DAMA Controller PDC which comprises equipment to control and monitor the conference stations through the satellite by means well known in the art.

The primary DAMA controller PDC is connected to a network management system NMS, consisting of a computer platform and software, as is known in the art, providing a user-friendly interface to monitor and control the conference system.

The network management system NMS can be connected to a conference selection panel 13 to further simplify the system operation as described above with reference to FIG. 7.

Figure 11:
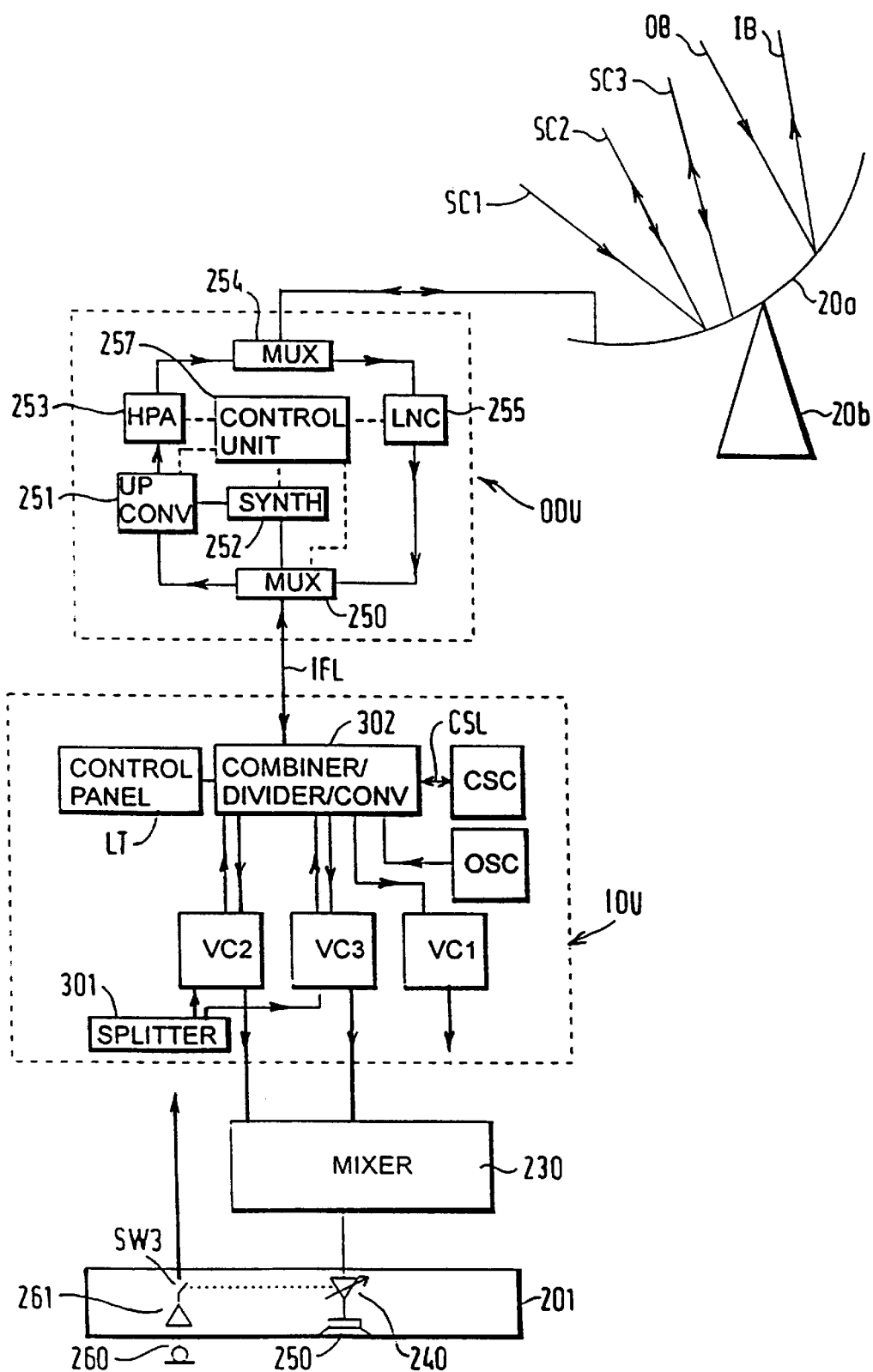
FIG. 11 shows in block diagrammatic form a conference station suitable for use in the system shown in FIG. 10.

FIG. 11 shows in more detail the construction of a conference station 20y. The outdoor unit ODU is mounted at an off-set (ie off-set from the satellite dish) focal point of the satellite antenna and connected through a single coaxial cable IFL to the indoor unit IDU accommodated inside a building. The outdoor unit ODU is, in this example, based on the "NEXTAR" (trademark)—5H Ku-band outdoor unit manufactured by NEC corporation of Tokyo, Japan. For aspects of this unit reference may be made for example, to U.S. Pat. Nos. 4,901,369, 4,803,440, 4,590,417, 4,965,851, 4,967,413 and European patent application no. 95120679.6, the whole contents of which are hereby incorporated by reference. The outdoor unit has a transmission path and a reception path. The transmission path converts a modulated intermediate frequency (IF) carrier in the 160 to 200 MHz band supplied via multiplexing unit 250 from the indoor unit IDU via the interfacility frequency (IF) link cable IFL up into the 14 to 14.5 GHz band in 20 MHz steps using a transmission mixer or up-converter 251. The upconverted signal is then amplified by a high power amplifier 253 and supplied via a multiplexing unit 254 to the antenna 20a.

The reception path of the outdoor unit ODU comprises a low noise converter 255 for receiving an amplifying and incoming RF signal from the multiplexing unit 254 and for converting the received RF signal into an intermediate frequency (IF) signal in the 160 to 200 MHz band. The IF and RF band widths of the outdoor unit are such that only a single outdoor unit is required for up and down conversion of all three satellite communication channels and the associated data channels. Reference frequency signals for the up converter 251 and the low noise converter are derived by a synthesizer 252 and a 10 MHz signal supplied by the cable IFL from a 10 MHz stable crystal oscillator OSC provided in the indoor unit IDU. The synthesiser 252 comprises a phased locked oscillator and contains multiple feedback loops to realise a very accurate output frequency. The operation of the components of the outdoor unit ODU is controlled by a control unit 257 which enables, for example, control of gain and level and supply of the reference signal for the low noise converter 257.

The indoor unit IDU comprises a respective voice channel card VC1, VC2 and VC3 for each of the satellite communication channels SC1, SC2 and SC3, respectively.

Figure 13A:
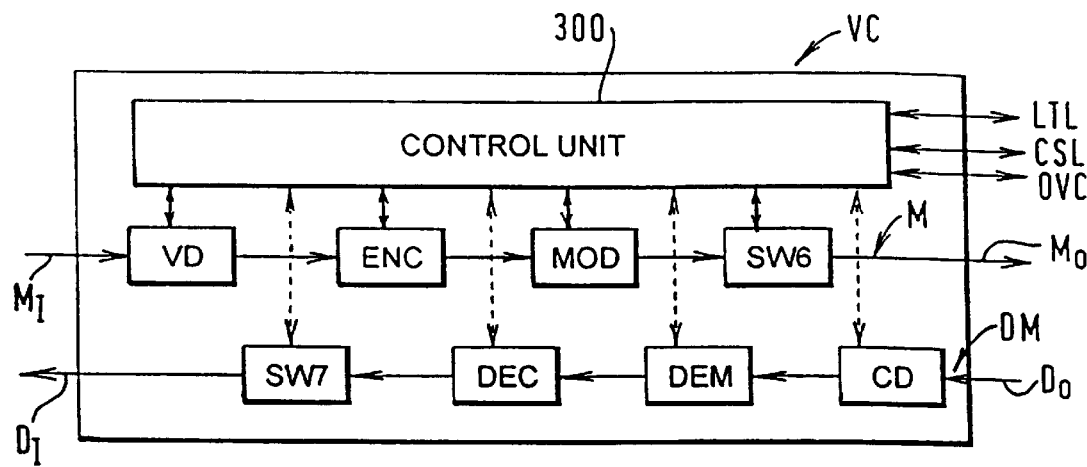
FIG. 13a shows a block diagram of a voice channel card suitable for use in the conference station shown in FIG. 11

As shown in FIG. 13a, each of the voice communication cards VC comprises a modulation M and a demodulation D path for the associated satellite communication channel. The modulation path M comprises a voice detector VD, an encoder ENC, a modulator MOD and a switch SW6. The demodulation path DM of the voice channel card comprises a carrier detection unit CD, a demodulator DEM, a decoder DEC and a further switch SW7. Operation of the components in the modulation and demodulation path is controlled by the control unit 300 as will be described below.

As the voice channel card VC1 is to be used only for receiving the first satellite communication channel SC1 which is dedicated to the hub or conference control station 10', the modulation path of the voice channel card VC1 is deactivated or not used.

The modulation path input M1 of the voice channel card VC2 or VC3 is coupled, via a splitter 201 of conventional form, to the microphone 260 via the amplifier 261 and the switch SW3 as described above with reference to FIG. 5. The demodulation path output $D_O$ of each of the three voice channel cards VC1, VC2 and VC3 is input to the mixer to 230 as described above with reference to FIGS. 3 and 4. The mixer 230 provides an output to the loudspeaker 250 via the variable amplifier 240 as described above.

The modulation path outputs $M_O$ of the voice channel cards VC2 and VC3 and the demodulation path inputs $D_I$ of all three voice channel cards VC1, VC2 and VC3 are coupled by a conventional combiner/divider or a multiplexing/demultiplexing unit 302 and the interfacility frequency link IFL to the outdoor unit ODU. Although shown separately in FIG. 11, generally the oscillator OSC will be provided in the combiner/divider 302.

The unit 302 further accommodates a synthesised down converter. The second down conversion is performed to allow both the transmit and receive signals and the dc signal for the outdoor unit to be transferred through a single coaxial cable interfacility frequency link IFL. For aspects of the IFL reference may be made for example to Japanese patent 4-66413, the whole contents of which are hereby incorporated by reference.

The indoor unit IDU also comprises a common signalling channel card CSC of known form which, although not shown, like the voice channel cards, comprises modems and codecs under the control of a control unit. The common signalling channel card CSC enables data to be transmitted to and received from the conference station on the dedicated data communication channel D1, D2 or D3 etc (indicated as D1 in FIGS. 11 and 12).

A local operator control panel LT is provided integral with or external to the indoor unit IDU. The operator panel will generally include an on/off switch for controlling activation or deactivation of the conference station together with status indicators for indicating whether the conference station is operating correctly and, for example, whether, as discussed above, the hub has intervened to disconnect the conference station for any reason. The control unit 300 of each voice channel card VC communicates with the data channel card CSC on line CSL, with the control units of other voice channel cards on line OVC and, via the combiner/divider (302), with the control panel LT on line LTL.

Figure 12:
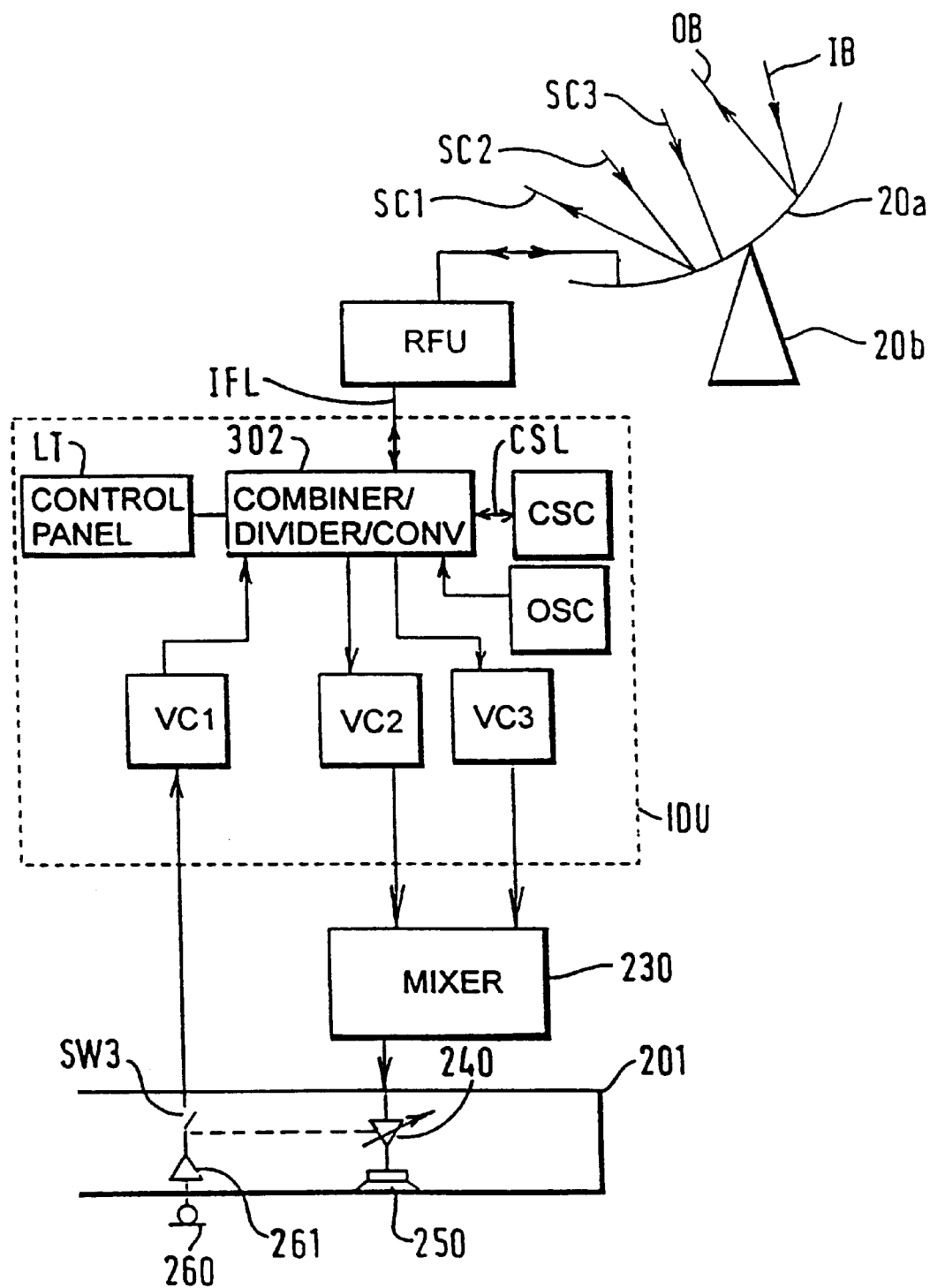
FIG. 12 shows in block diagrammatic form parts of a control station suitable for use in the system shown in FIG. 10.

FIG. 12 is a block schematic diagram similar to FIG. 11 showing parts of the control station 10'. For simplicity, the divider/combiner DIV/COM, the controller PDC, the network management system NMS and the conference selection panel 13 are omitted from FIG. 12. The outdoor unit RFU is shown simply as a block as it will be similar to the outdoor unit shown in FIG. 11. In the case of the control station, the modulation path for the voice channel cards VC2 and VC3 and the demodulation path for the voice channel card VC1 are not required and are therefore rendered inactive or even omitted. Inactivation may be achieved by, for example, causing the switches SW6 and SW7 to be permanently opened or closed as is appropriate.

Instabilities in oscillators and Doppler shift effects due to relative movement between the satellite and the conference stations may cause the satellite communication and data channel frequencies to vary. In the present example, the demodulators used are of the E8196 VO CH card type produced by NEC of Tokyo, Japan and described in a paper entitled "Burst mode SCPC modem with high coding gain FEC" by Namiki, Ohtani and Yasuda published in the Proceedings of the IEEE International Conference on Communications, Jun. 22–25, 1986 Toronto Canada at pages 1792 to 1796 and disclosed in U.S. Pat. No. 4,967,413 and in European Patent Application No. 95120679.6, for example. These enable quick lock on to the incoming satellite communication channels despite such frequency variations. In addition, the outdoor unit ODU/RFU uses one of the available satellite channels, generally the outbound data channel OB, as a reference signal. Any error in the frequency of the return of this reference signal is determined by the control unit of the appropriate channel card, in this case the CSC channel card. Any difference between these two signals is fed aback to respective voltage controlled oscillators of the transmission and reception paths of the conference station to adjust the frequencies accordingly.

Figure 13B:
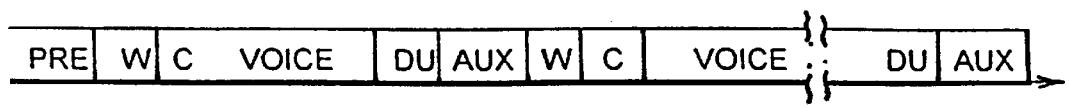
FIG. 13b shows a diagram of the signal structure.

The structure of the signal supplied by the VSAT is illustrated diagrammatically in FIG. 13b. As shown, the signal comprises a preamble PRE, including a VSAT identification, a unique 32 bit word W as discussed in, for example, U.S. Pat. No. 4,967,413, 24 control bits C for standard exchange of information between conference stations, a 640 bit voice signal VOICE, a number of dummy bits DU and then four auxiliary bits AUX indicating either termination of the signal or continuance in another section which repeats the unique word, control, voice, dummy and auxiliary bits discussed above. The number of dummy bits depends on the forward error coding technique used.

The operation of the conference station shown in FIG. 11 will now be described. In the interests of simplicity, the operation of the conference station with respect to transmission on the second and third channels SC2 and SC3, the operation of the conference station with respect to reception of signals on channels SC2 and SC3 and the monitoring and control functions of the conference station will be described separately with respect to the respective flow charts shown in FIGS. 14 to 17. It will, however, be appreciated that the conference station is generally carrying out all these functions at the same time. The operation of the conference station with respect to receipt of signals from the hub 10' on channel SC1 will not be described as the conference stations are arranged always to receive these signals and enabled unimpeded access by the hub.

Figure 14:
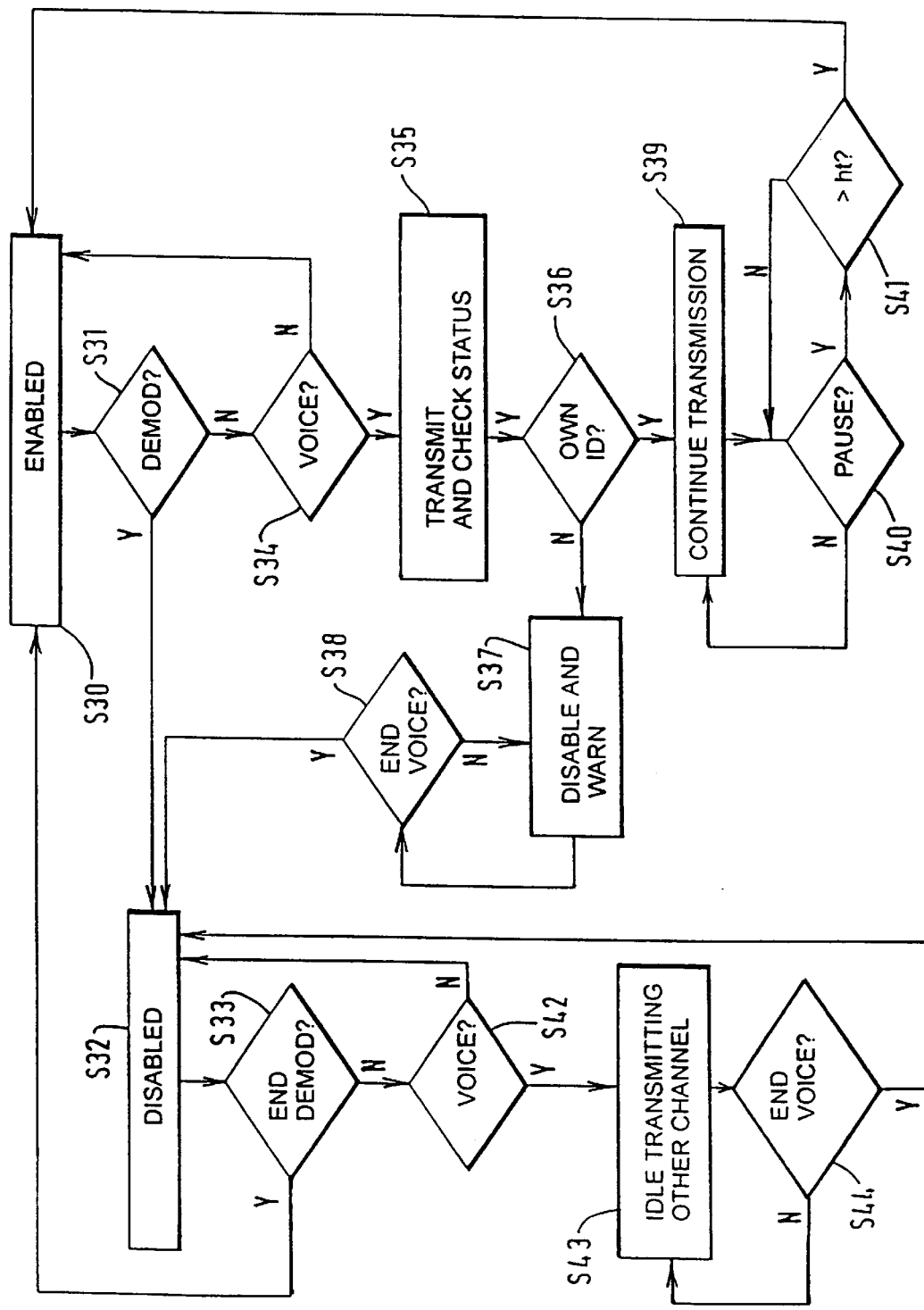
FIGS. 14 to 17 are flow charts for illustrating the operation of the conference station shown in FIG. 11.

FIG. 14 is a flow chart showing the control of the modulation path of the voice channel card VC2.

As shown in FIG. 14, the modulation path of the voice channel card VC2 is, for the purposes of this explanation, initially considered to be enabled at step S30 awaiting voice activation. If the control unit of the voice channel card VC2 determines at step S31 that a signal is being received by the channel detector of the corresponding demodulation path in the absence of voice detection by the voice detector VD, then the modulation path is disabled at step S32 by opening the switch SW6. When the end of this demodulation is determined at step S33, the modulation path returns to the enabled state and the switch SW6 is closed.

When a voice signal is detected by the voice detector VD as indicated by step S34, the voice signal is encoded, modulated and supplied to the outdoor unit for up conversion and transmission and, as indicated at step S35, the control unit is in a state checking for collisions. If the control unit determines at step S36 that the carrier detector CD does not detect the return of the conference station's own identification within a predetermined time limit as discussed above with reference to FIGS. 4 to 6, then the control unit disables voice transmission along the modulation path by opening the switch SW6 at step S37 and issues a warning to the participants at this conference station by, for example, activating a buzzer or a flashing light on the local control panel LT until it is determined at step S38 that the voice activation has stopped. The modulation path then remains in the disabled state SS2 with the switch SW6 opened until the end of the modulation is determined at step S33 by the carrier detector CD.

If the conference station's own identification is determined at step S36, then transmission of the voice signal is continued as indicated by step S39 until a pause is detected at step S40. If the pause is determined to be greater than a hangover time ht (typically 200 to 500 milliseconds) at step S41, the control unit determines that the participant has finished speaking and returns the modulation path to the enabled state indicated by step S30. The hangover time is arranged to be sufficient to avoid natural pauses within speech causing the conference station to lose the communication channel.

If a voice signal is detected at step S42 when the modulation path of the voice channel card VC2 is in the disabled state indicated by step S32, then the control unit determines at step S43 that the conference station is probably transmitting on the other voice channel card VC3 and remains in an idle state until the end of the voice signal at step S44 when the modulation path of the voice channel card VC2 returns to the disabled state indicated by step S32.

Figure 15:
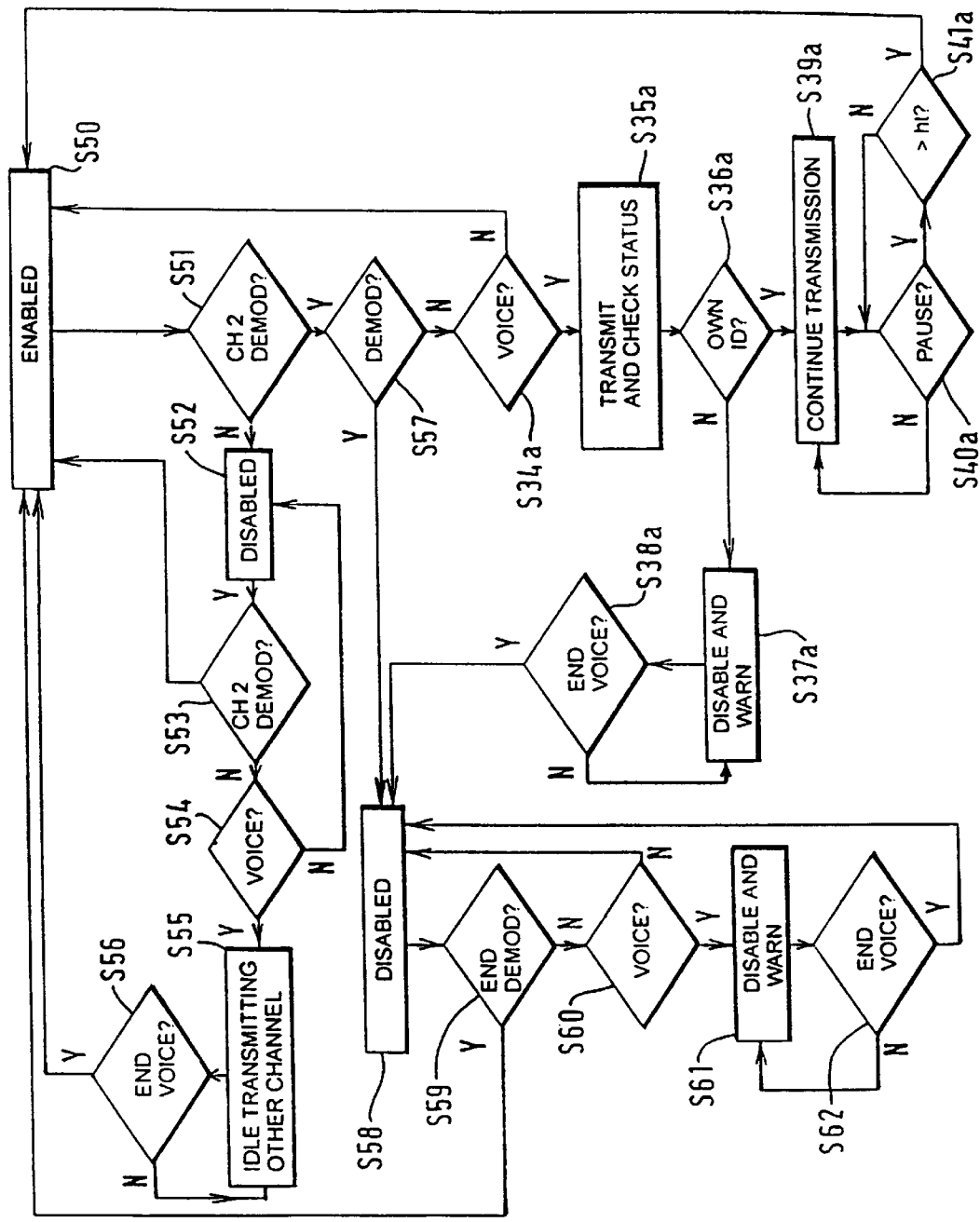

As shown in FIG. 15, the voice channel card VC3 is initially considered to be in an enabled state S50 in which it's switch SW6 is closed. If the second satellite communication channel SC2 is determined not to be occupied by another conference participant at step S51, then the modulation path of the voice channel card VC3 is disabled by opening the switch SW6 (step S52) until it is determined at step S53 that the second satellite communication channel is occupied, when the voice channel card VC3 returns to the enabled state S50. When the voice channel card VC3 is in the disabled state indicated by step S52 and a voice signal is detected by the voice detector VD at step S54, the control unit places the voice channel card VC3 in the idle state (step S55) indicating that transmission is occurring on the other channel SC2 until the end of the voice signal is determined at step S56 when the voice channel card VC3 is returned to the enabled state (550).

If the second channel is determined to be occupied at step S51 and demodulation is also detected on the third satellite communication channel SC3 at step S57 in the absence of a voice signal being detected by the voice detector VD of the voice channel card VC3, then the modulation path of the voice channel card VC3 is disabled at step S58 until the end of the demodulation is determined at step S59. If a voice signal is detected at step S60, then the control unit 200 determines that both the second and third satellite communication channels SC2 and SC3 are occupied and causes a warning to be issued (step S61) to the participant indicating that both channels SC2 and SC3 are occupied until the control unit 200 determines at step S62 that the voice detector VD is no longer detecting a voice signal when the card is returned to the disabled state S58.

If the carrier detector CD of the voice channel card VC3 does not detect an incoming signal on its communication channel at step S57, then the voice channel card VC3, under the control of its control unit 200, proceeds to carry out steps S34a to S41a analogous to steps S34 to S41 described above.

As will be appreciated from the above, a conference station 20y preferentially selects the voice channel card VC2, that is the second satellite communication channel. If it determines that this satellite communication channel is occupied by another participant, then transmission is effected on the third satellite communication channel under the control of the voice channel card VC3 unless that channel too is occupied. If both the second and third communication channels are occupied by other participants, then a warning signal is given to the conference station participant to indicate that he cannot speak at the present time. A warning is similarly indicated if the return of the conference participant's own voice signal is not detected within a predetermined time limit, indicating either a collision or lack of reception by the satellite or the VSAT for some reason.

Figure 16:
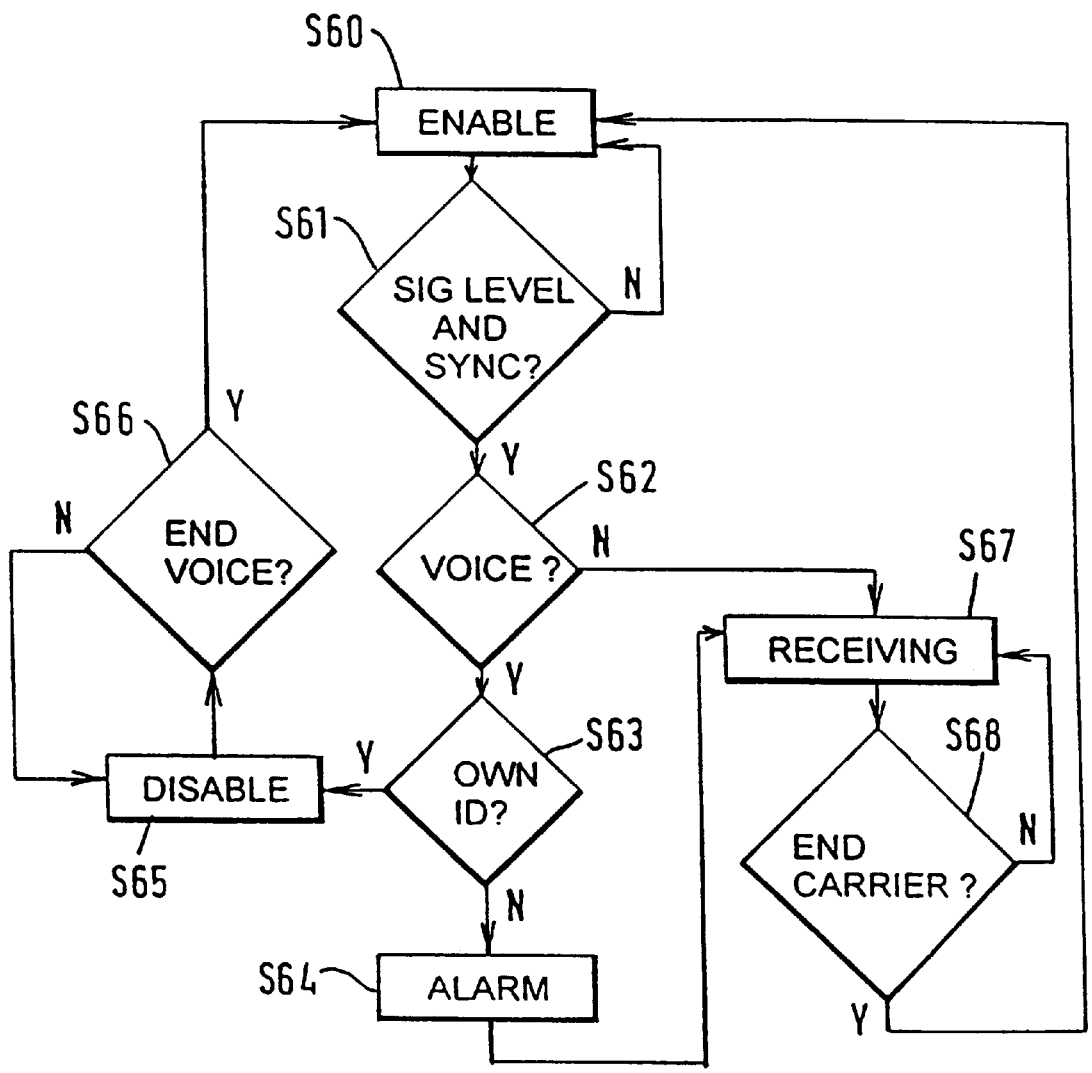

FIG. 16 is a flow chart illustrating the demodulation function of the voice channel cards VC2 and VC3. The demodulation path is initially considered to be in an enabled state with the switch SW7 closed as indicated by step S60. Once the carrier detector CD detects an incoming signal, and the control unit 200 determines that it has been correctly synchronised and acquired at step S61, taken the control unit 200 checks to determine whether a voice signal is being detected by its own voice detector VD at step S62. If so, and the carrier detector CD is not receiving the return of its own signal, an alarm is generated at step S64 as described above with reference to FIGS. 14 and 15 until the end of the voice signal (step S64). If the return of the participants own identification signal has been correctly identified, then the switch SW7 is opened (step S65) until the end of the voice signal (step S66) so as to disable the demodulation path to prevent the participant receiving an echo of his own voice.

If a received signal is not a return of the conference station's own signal, switch SW7 is kept closed to enable reception of the signal at step S67. When the control unit 300 determines, from the state of the carrier detector CD, the end of an incoming signal from another conference station (step S68), the demodulation path returns to the enabled state S60 awaiting an incoming signal.

As indicated above, each conference station also communications with the hub in known fashion via data communication channels, with each conference station receiving the same outbound communication channel OB from the conference control station utilising a Time Division Multiplexing method well known in the art and each conference station transmitting to the same inbound communication channel IB utilising a Time Division Multiple Access method well known in the art. The control unit 300 also exchanges information and data with the local operator control panel LT via line LTL and with other control units 300 of the conference station on line OVC.

Data communications on the data channels are received from and supplied to the control unit 300 via the line CSL.

Figure 17:
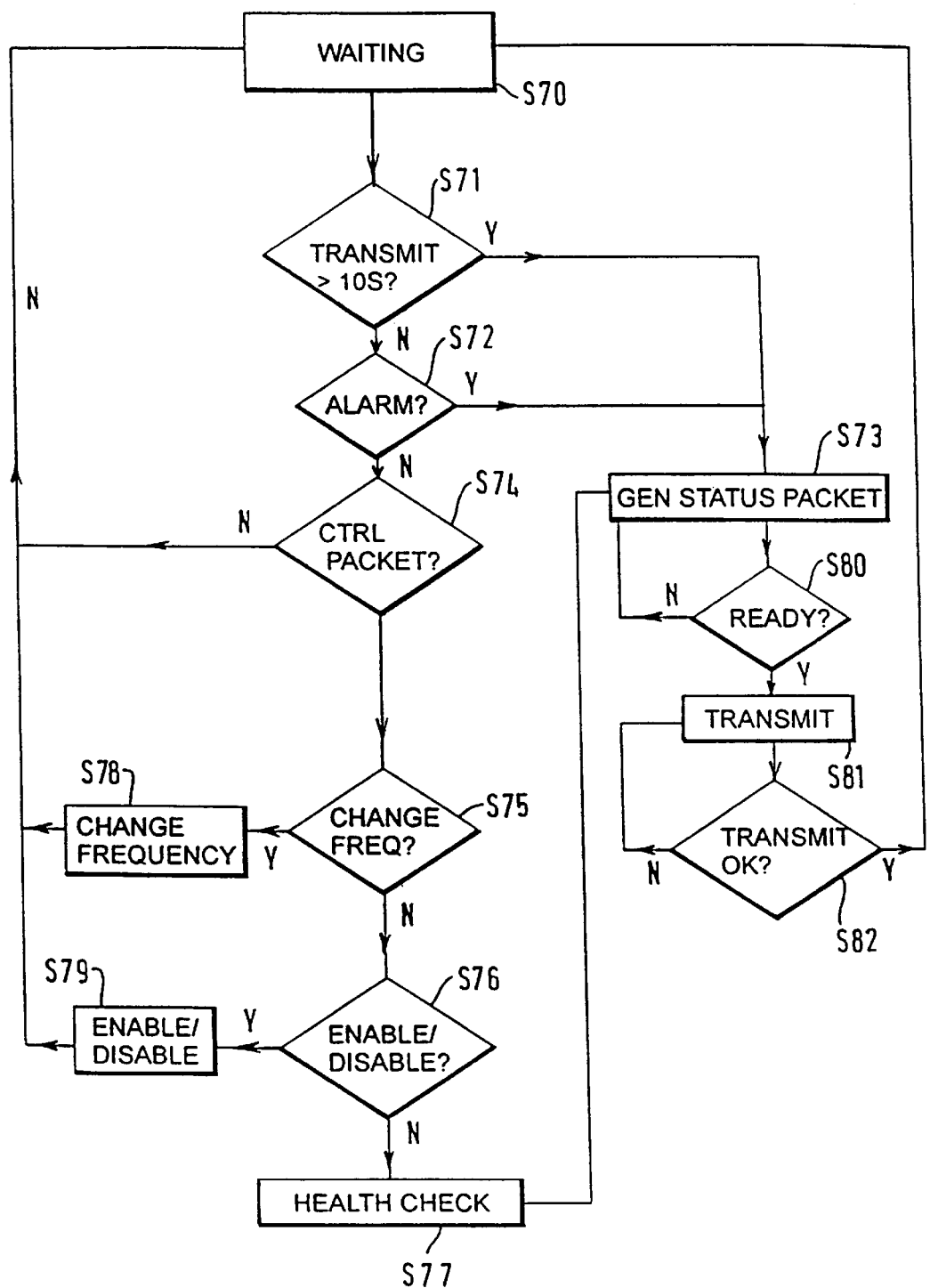

As shown in FIG. 17, the control unit of the CSC channel card is, for the ease of explanation, initially considered to be in a waiting state (step S70) monitoring for receipt of a control package from the hub on the demodulation path and for signals from the voice channel cards VC2 and VC3 indicating either an alarm or the fact that the conference station is transmitting.

In the event that an alarm has been generated by the conference station (step S71) or the conference station has been transmitting for greater than ten seconds (step S72), then the control unit of the CSC voice channel card activates its modulation path and prepares a general status packet at step S73.

When the control unit of the SC channel card determines at step S74 that a control packet has been received from the hub it determines whether the control information requires a change of frequency (step S75), a change of state of the conference station or one of its voice channel cards (that is enabling the conference station or a voice channel card if it is disabled or vice versa) at step S76 or a health check (step S77). A frequency or state change, as the case may be, is carried out at step S78 or S79. Reference may be made to U.S. Pat. No. 4,965,857 with respect to changing of channel frequencies.

When the control unit of the CSC channel card determines that a health check has been requested at step S77, then a general status packet is prepared at step S73 as discussed above to supply to the hub, in known manner, information concerning the operational status of the conference station. Once ready at step S80, a general status packet is transmitted by the modulation path of the CSC channel card and the outdoor unit ODU on the data channel associated with the conference station as indicated at step S81. Once transmission is confirmed as being OK at step S82 by, for example, receipt of an acknowledgement signal from the hub on the return data channel, then the control unit of the CSC voice channel card returns to the waiting state.

As will be appreciated, the conference stations have no control over the receipt of signals on the first satellite communication channel, so ensuring that the hub can always communicate with any of the conference stations. Similarly, the hub always receives signals on each of the three satellite communication channels for each conference group and, as discussed above with reference to FIGS. 4 to 9, receives a mix of all communications in that conference group.

Also as discussed above with reference to FIGS. 4 to 9, the hub may have a separate group of three voice channel cards for each conference group so enabling the hub to monitor simultaneously all existing conference groups.

As will be appreciated from FIG. 17, the data channels enable the hub to control changing of the satellite communication channels associated with a particular conference station enabling the hub to move that conference station between conference groups as discussed in the first embodiment with reference to, for example, FIG. 7. It will also be appreciated that conference groups may also be coupled together in this embodiment in the manner described with reference to FIGS. 8 and 9 above.

Although the arrangements described above with reference to FIGS. 3 to 6 and 9 to 17 avoid a participant hearing a direct echo of his own signal by disconnecting the return of his own signal from the mix supplied to his loudspeaker, further echo problems may arise if two participants at difference conference stations are communicating at the same time. Thus, the voice signal received from a first conference station by a second conference station may be picked up by the microphone of the second conference station and retransmitted to the first conference station. Although, in practice, this signal will be significantly attenuated by 20 dB or more, it may still be disturbing to the participants. In order to deal with this problem, a further echo canceller may be provided between the indoor unit IDU and the audio mixer 230 which adds to the voice communication from the participant at that conference station, the incoming signal received from the other conference station 180° out of phase with the incoming signal so that these two signals destructively interfere and the other conference participant does not receive an eco of his own signal. This may be achieved using known means as used in conventional 4-wire terrestrial conference systems.

Although the above-described embodiments propose that a conference group have available three satellite communication channels, one permanently assigned to the hub or a chairman and two available to the conference stations, the present invention may also be applied to a conference system in which more satellite communication channels are available to the conference stations, for example 3, 4 or 5 communication channels may be made available. Also, the present invention may be applied to conference systems wherein the hub or chairman does not have unimpeded access to the conference, for example where only the second and third satellite communication channels mentioned above are available and may be used by any of the conference stations and the conference control station. Similarly, the present invention may be applied to systems wherein only one satellite communication channel is available to the conference participants, with or without a separate unimpeded access satellite communication channel for a controller or chairman at the hub, for example. It should also be appreciated that, where an unimpeded access satellite communication channel is provided to a conference group, it may not necessarily be allocated to the hub but could be allocated to a conference station, possibly on a rota basis. If this is desirable, then the conference stations would be modified to enable voice transmission and reception on, in the examples described above all three satellite communication channels with access to transmission via one of the voice channel cards being available to only one of the conference station, for example under software control from the hub via the CSC channel card.

It should, of course, be appreciated that although the present invention has been described for use in a broadcasters satellite conferencing system, the present invention may be utilised in any circumstances where conferencing or other communication facilities are required between participants located at different locations within the footprint of a communication satellite.

As indicated above, commercially available components may be used in the described system.

Although the above description refers to a satellite conference system, the present invention may also be applied to terrestrial based wireless, for example RF (radio frequency) or microwave, communication systems.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention.

What is claimed is:

1. A conference station for use in a system for enabling a conference by satellite using at least one satellite communication channel comprising:

means for receiving communications on at least one satellite communication channel allocated to the conference station and having a given frequency;

means for transmitting communications on at least one satellite communication channel allocated to the conference station and having a given frequency;

means for controlling access from the conference station to the satellite communication channel or channels allocated for transmissions from the conference station comprising means for detecting whether a communication is being received on an allocated satellite communication channel, means for determining that a satellite communication channel allocated for use by the transmitting mean, is free for use or unoccupied when the detecting means does not detect a communication from another conference station on that channel, and means for enabling transmission by the transmitting means of a satellite communication on a communication channel allocated for use by the transmitting means when that communication channel is determined to be free whereby a participant at the conference station can speak in a conference when a satellite voice communication allocated to the conference statice is free;

means responsive to a data signal received on a satellite data channel from a conference control station for controlling the satellite communication receiving means to adjust the allocated satellite communication channel frequency or frequencies on which the receiving means is arranged to receive communications; and means responsive to a data signal received on a satellite data channel from a conference control station for controlling the satellite communication transmitting means to adjust the allocated satellite communication channel frequency or frequencies on which the transmitting means is arranged to transmit communications.

2. A conference station according to claim 1, comprising means for inhibiting an echo of a communication sent by the conference station.

3. A conference station according to claim 2, wherein the means for inhibiting an echo of a communication sent by the conference station is arranged to detect reception by the receiving means of return of a communication sent by the conference station.

4. A conference station according to claim 3, wherein the inhibiting means is adapted to disconnect the conference station from a communication channel carrying a return of a communication sent by the conference station.

5. A conference station according to claim 1, comprising means for receiving a communication on at least one communication channel not available for transmission from the conference station.

6. A conference station according to claim 1, comprising means for checking whether a transmission from that conference station is received.

7. A conference station according to claim 1, comprising a respective modulating means for each communication channel on which the station is arranged to transmit.

8. A conference station according to claim 1, wherein transmission is arranged to be voice-activated.

9. A conference station according to claim 1, comprising means for changing the communication channel(s).

10. A voice channel card for a conference station for enabling communication by satellite or other wireless means, comprising the features recited in claim 1.

11. A system for enabling a conference by satellite or terrestrial wireless communication, comprising a plurality of conference stations in accordance with claim 1.

12. A system in accordance with claim 11, further comprising a conference control station adapted to transmit signals on a given communication channel to the conference stations which are adapted to receive but not transmit signals on the given communication channel.

13. A system for enabling a conference by satellite communication, comprising a conference control station and a number of conference stations according to claim 1, the conference stations forming at least one group of conference stations, the control station having means of transmitting signals on a first satellite communication channel allocated to the group of conference stations and each conference station of the at least one group having means for transmitting signals on any of a given number of further satellite communication channels allocated to the group, the number of further satellite communication channels allocated to the group being small compared to the number of conference stations in the system, the conference control station having means for receiving signals on the further satellite communication channels allocated to the group, and each conference station of the group having means for receiving signals on the first satellite communication channel allocated to the group from the control station and on any of the number of further satellite communication channels allocated to the group from any other conference stations of the group.

14. A system according to claim 13, wherein the given number of further satellite communication channels allocated to the group of conference stations is two.

15. A system according to claim 13, wherein the conference control station comprises means for forming a plurality of groups of the conference stations and means for allocating different communication channels to different groups.

16. A system according to claim 15, wherein the conference control station comprises means for coupling two or more conference groups together to enable communication between conference groups via the conference control station.

17. A system according to claim 15, wherein the conference control station comprises an N–1 matrix arranged to couple two or more conference groups together to enable communication between conference groups via the conference control station.

18. A system according to claim 13, wherein the conference stations form at least two conference groups and the conference stations in different conference groups are arranged to transmit and receive signals on different allocated further communication channels.

19. A system according to claim 18, wherein the transmitting means of the conference control station is arranged to transmit signals on different first communication channels allocated to different groups of conference stations and the receiving means of each conference station of a group is arranged to receive signals from the control station on only the one of the first communication channels allocated to that group.

20. A system according to claim 13, wherein the conference control station comprises means for moving conference stations from one conference group to another.

21. A conference station according to claim 1, wherein the receiving means is arranged to receive communications on two communication channels and the access controlling means is arranged to select an unoccupied one of the two communication channels for a transmission.

22. A conference station according to claim 21, wherein the access controlling means is arranged to select one communication channel in preference to the other when both communication channels are unoccupied.

23. A conference station according to claim 1, wherein the receiving means is arranged to receive signals on a first satellite communication channel and a number of further satellite communication channels allocated to the station, the receiving means comprising a respective demodulating means for each satellite communication channel; the transmitting means is arranged to transmit signals on any of the allocated further satellite communication channels, the transmitting means comprising a respective modulating (282, 283; MOD) means for each allocated further satellite communication channel.

24. A conference station according to claim 23, wherein the control means is arranged to control the receiving means to inhibit reception by a participant at the station of a return of a signal transmitted by the station.

25. A conference station according to claim 1, comprising a loudspeaker to provide an audio output.

26. A voice channel card for use in a conference station in accordance with claim 1 for use in a system having a plurality of such conference stations and a conference control station, the card having means for controlling access to a specific satellite communication channel allocated to the station independently of the control station, comprising:

means for detecting whether a communication is being received on the specific allocated satellite communication channel;

means for determining that the specific allocated satellite communication channel is free for use when the detecting means does not detect a communication from another conference station on that channel; and means for enabling transmission by the conference station of a communication on the specific allocated satellite communication channel directly to one or more of the conference stations when that communication channel is determined to be free, whereby access to the communication channel is controlled by the controlling means without any need for communication with the control station.

27. A conference station comprising at least two voice channel cards in accordance with claim 26 with each voice channel card being adapted to receive and transmit signals to be communicated on a respective communication channel and a further voice channel card comprising means for decoding and demodulating a signal received on another communication channel different from the communication channels on which the at least two voice channel cards are adapted to transmit and receive signals.

28. A card according to claim 26, further comprising means for inhibiting an echo of a communication enabled by the enabling means.

29. A card according to claim 28, wherein the means for inhibiting an echo is arranged to detect the return of a communication enabled by the enabling means.

30. A card according to claim 29, wherein the inhibiting means is arranged to disconnect a communication channel carrying a return of a communication enabled by the enabling means.

31. A voice channel card for use in a conference station in accordance with claim 1 for use in a satellite conference system having a plurality of such conference stations and a conference control station, the card comprising:

voice detection means for detecting a voice signal from a participant at the conference station;

means for encoding and modulating the voice signal;

first switch means for supplying the encoded and modulated signal to means for transmitting a communication signal on a satellite communication channel;

means for detecting a signal received on the same communication channel;

means for demodulating and decoding the received signal;

second switch means for supplying the demodulated and decoded signal to the participant at the conference station; and control means for controlling operation of the first switch means to inhibit transmission of a signal by the participant at the conference station when a signal from another conference station using that communication channel is detected and for controlling operation of the second switch means to inhibit supply of a received signal to the participant when the control means determines that the received signal is the return of a signal transmitted by the conference station, whereby access to the communication channel is controlled by the control means without any need for communication with the control station.

32. A conference station comprising at least two voice channel cards in accordance with claim 31 with each voice channel card being arranged to receive and transmit signals to be communicated on a respective communication channel.

33. A conference station according to claim 32, further comprising a further voice channel card comprising means for demodulating and decoding a signal received on another communication channel different from the communication channels on which the at least two voice channel cards are arranged to transmit and receive signals.

34. A station according to claim 1, further comprising means for advising a participant at the conference station when the at least one satellite communication channel is not free for transmission from the conference station so that the participant can defer spoken participation in a conference.

35. A satellite communication conference station for use in a satellite communication system, comprising: means for receiving voice signals on a first satellite communication channel and a number of further satellite communication channels allocated to the station, the receiving means comprising a respective demodulating means for each satellite communication channel; means for transmitting voice signals on any of the allocated further satellite communication channels, the transmitting means comprising a respective modulating means for each allocated further satellite communication channel; and control means for controlling the modulating and demodulating means, the control means being arranged to control the transmitting means to prevent transmission of voice signals on an allocated further satellite communication channels only when signals from another station are present on that channel so that a participant can speak in a satellite conference when at least one of the further satellite communication channels allocated to the station is free, thereby enabling transmission of voice signals without the conference station having to request access to the allocated communication channel from a control station.

36. A conference station according to claim 35, wherein the control means is arranged to control the receiving means to inhibit reception by a participant at the station of a return of a signal transmitted by the station.

37. A station according to claim 35, further comprising means for advising a participant at the conference station when the further satellite communication channels are occupied by transmissions from other conference stations so that the participant can defer spoken participation in the conference until one of the further satellite communication channels is free.

38. A satellite communication system for enabling conference by satellite communication, comprising a satellite conference control station and a number of satellite conference stations forming at least one group of satellite conference stations, the control station having means for transmitting signals on a first satellite communication channel allocated to the at least one group of conference stations, the transmitting means of each conference station of the at least one group being arranged to transmit signals on any of a given number of further satellite communication channels allocated to the group without having to request the control station to grant access to a satellite communication channel, the number of further satellite communication channels allocated to the group being small compared to the number of conference stations in the system, the conference control station having means for receiving signals on the further satellite communication channels allocated to the group, and the receiving means of each conference station of the group being arranged to receive signals on the first satellite communication channel allocated to the group from the control station and on any of the number of further satellite communication channels allocated to the group from any other conference stations of the group.

39. A system according to claim 38, wherein the given number of further satellite communication channels allocated to the group of conference stations is two.

40. A system according to claim 38, wherein the conference control station comprises means for forming a plurality of groups of the conference stations and means for allocating different communication channels to different groups.

41. A system according to claim 38, wherein the conference stations form at least two conference groups and the conference stations in different conference groups are arranged to transmit and receive signals on different allocated further communication channels.

42. A system according to claim 41, wherein the transmitting means of the conference control station is arranged to transmit signals on different first communication channels allocated to different groups of conference stations and the receiving means of each conference station of a group is arranged to receive signals from the control station on only one of the first communication channels allocated to that group.

43. A system according to claim 38, wherein the conference control station comprises means for moving conference stations from one conference group to another.

44. A system according to claim 38, wherein the conference control station comprises means for coupling two or more conference groups together to enable communication between conference groups via the conference control station.

45. A system according to claim 38, wherein the conference control station comprises an N–1 matrix arranged to couple two or more conference groups together to enable communication between conference groups via the conference control station.

46. A satellite communication conference station for use in a satellite communication system, comprising: means for receiving voice signals on a first satellite communication channel and a number of further satellite communication channels allocated to the station, the receiving means comprising a respective demodulating means for each allocated satellite communication channel; means for transmitting voice signals on any of the allocated further satellite communication channels, the transmitting means comprising a respective modulating means for each allocated further satellite communication channel; control means for controlling the modulating and demodulating means, the control means being arranged to control the transmitting means to enable transmission of voice signals without the conference station having to request access to the allocated communication channel from a control station and to prevent transmission of voice signals on one of the allocated further satellite communication channels only when signals from another station are present on that channel, and means for advising a participant at the conference station when the further satellite communication channels allocated to the station are occupied by transmissions from other conference stations, so that the participant can defer spoken participation in the conference until one of the further allocated satellite communication channels is free.

47. A conference station for use in a satellite conference system having a plurality of such conference stations and a conference control station, the conference station comprising at least two voice channel cards each having:

voice detection means for detecting a voice signal from a participant at the conference station;

means for encoding and modulating the voice signal;

first switch means for supplying the encoded and modulated signal to means for transmitting a communication on a respective allocated satellite communication channel with the satellite communication channels allocated to the different voice channel cards being different;

means for detecting a signal received on the same communication channel;

means for demodulating and decoding the received signal;

second switch means for supplying the demodulated and decoded signal to the participant at the conference station; and control means for controlling operation of the first switch means to inhibit transmission of a signal by the participant at the conference station when a signal from another conference station using that communication channel is detected and for controlling operation of the second switch means to inhibit supply of a received signal to the participant when the control means determines that the received signal is the return of a signal transmitted by the conference station, whereby access to the communication channel is controlled by the control means without any need for communication with the control station, the conference station also comprising means for advising a conference participant at the conference station when the satellite voice communication channels allocated to the two voice channel cards are both occupied by transmissions from other conference stations so that the participant can defer speaking in the conference until a channel is free.

48. A satellite communication system for enabling conference by satellite communication, comprising a satellite conference control station and a number of satellite conference stations forming at least one group of satellite conference stations, the control station having means for transmitting signals on a first satellite communication channel allocated to the at least one group of conference stations, transmitting means of each conference station of the at least one group being arranged to transmit signals on any of a given number of further satellite communication channels allocated to the group without having to request the control station to grant access to a satellite communication channel, the number of further satellite communication channels allocated to the group being small compared to the number of conference stations in the system, the conference control station having means for receiving signals on the further satellite communication channels allocated to the group, and receiving means of each conference station of the group being arranged to receive signals on the first satellite communication channel allocated to the group from the control station and on any of the number of further satellite communication channels allocated to the group from any other conference stations of the group, each conference station also having means for advising a conference participant at a conference station when the further satellite communication channels allocated to its group are occupied by transmissions from other conference stations in that group.

49. A conference station for use in a satellite conference system having a plurality of such conference stations and a conference control station, the conference station comprising:

first, second and third voice channel cards each associated with a different one of three satellite voice communication channels allocated to the conference station, wherein the first and second voice channel cards each have voice detection means for detecting a voice signal from a participant at the conference station, means for encoding and modulating the voice signal, first switch means for supplying the encoded and modulated signal to means for transmitting a communication signal on a respective one of the first and second allocation satellite communication channels;

means for detecting a signal received on the same communication channel, means for demodulating and decoding the received signal, second switch means for supplying the demodulated and decoded signal to the participant at the conference station; and control means for controlling operation of the first switch means to inhibit transmission of a signal by the participant at the conference station when a signal from another conference station using the allocated satellite communication channel is detected and for controlling operation of the second switch means to inhibit supply of a received signal to the participant when the control means determines that the received signal is the return of a signal transmitted by the conference station, whereby access to the communication channel is controlled by the control means without any need for communication with the control station;

and wherein the third voice channel card has means for detecting a signal received on the third allocated satellite communication channel;

means for demodulating and decoding the received signal;

and means for supplying the demodulated and decoded signal to the participant at the conference station;

and means for advising a participant at the conference station when spoken participation in a conference is not possible because the first and second allocated satellite communication channels are occupied by transmissions from other conference stations.

50. A conference station for use in a system for enabling a conference by satellite using at least one satellite communication channel comprising:
- at least one demodulator having an input for coupling to receive signals on at least one satellite communication channel having a given frequency and having an output;
- at least one mixer having at least one input coupled to the output of the one demodulator and having an output;
- at least one loudspeaker coupled to the output of the one mixer;
- at least one microphone having an output;
- at least one voice-activated modulator having an input coupled to the output of the one microphone and having an output;
- an up-converter having an input;
- a switch coupled between the output of the one voice-activated modulator and the input of the up-converter and having a control node; and
- means, including a processor and a memory, coupled to a control node of the switch, to the demodulator, to the voice-activated modulator, and to the up-converter; for controlling access from the conference station to the satellite communication channel or channels allocated for transmissions from the conference station, comprising:
  - means for detecting whether a communication is being received on an allocated satellite communication channel;
  - means for determining that a satellite communication channel allocated for use by the conference station is free for use or unoccupied when the detecting means does not detect a communication from another conference station on that channel; and
  - means for enabling transmission by the conference station of a satellite communication on a communication channel allocated for use by the conference station when that communication channel is determined to be free whereby a participant at the conference station can speak in a conference when a satellite voice communication allocated to the conference station is free;
- means responsive to a data signal received on a satellite data channel from a conference control station for adjusting the allocated satellite communication channel frequency or frequencies on which the conference station is arranged to receive communications; and
- means responsive to a data signal received on a satellite data channel from a conference control station for adjusting the allocated satellite communication channel frequency or frequencies on which the conference station is arranged to transmit communications.

51. A voice channel card for use in a conference station in accordance with claim 50 for use in a satellite conference system having a plurality of such conference stations and a conference control station, the card comprising:
- a voice detector having an input coupled to receive a voice signal from the one microphone and an output;
- an encoder having an input coupled to the output of the voice detector and an output;
- a modulator having an input coupled to the output of the encoder and an output;
- first switch coupled between the output of the modulator and a satellite signal transmitter for transmitting a communication signal on a satellite communication channel;
- a carrier detector having an input coupled to receive signals on the satellite communications channel and an output;
- a demodulator having an input coupled to the output of the carrier detector and an output;
- a decoder having an input coupled to the output of the demodulator and an output;
- second switch coupled between the output of the decoder and a loudspeaker at the conference station; and
- a control unit coupled to control the first and second switches and operable to control operation of the first switch to inhibit transmission of a signal by a participant at that conference station when a signal from another conference station using that communications channel is detected and to control operation of the second switch to inhibit supply of a received signal to the participant when the control unit determines that the received signal is the return of the signal transmitted by the conference station, whereby access to the communications channel is controlled without any need for communication with the control station.

52. A conference station comprising at least two voice channel cards in accordance with claim 50 with each voice channel card being arranged to receive and transmit signals to be communicated on a respective communication channel.

53. A conference station according to claim 52, further comprising a further voice channel card comprising:
- an other demodulator having an input coupled to received signals on another communication channel different from the communication channels on which the two voice channel cards are arranged to transmit and receive signals and an output; and
- an other decoder having an input coupled to the output of the other demodulator.

* * * * *